Figure 1:
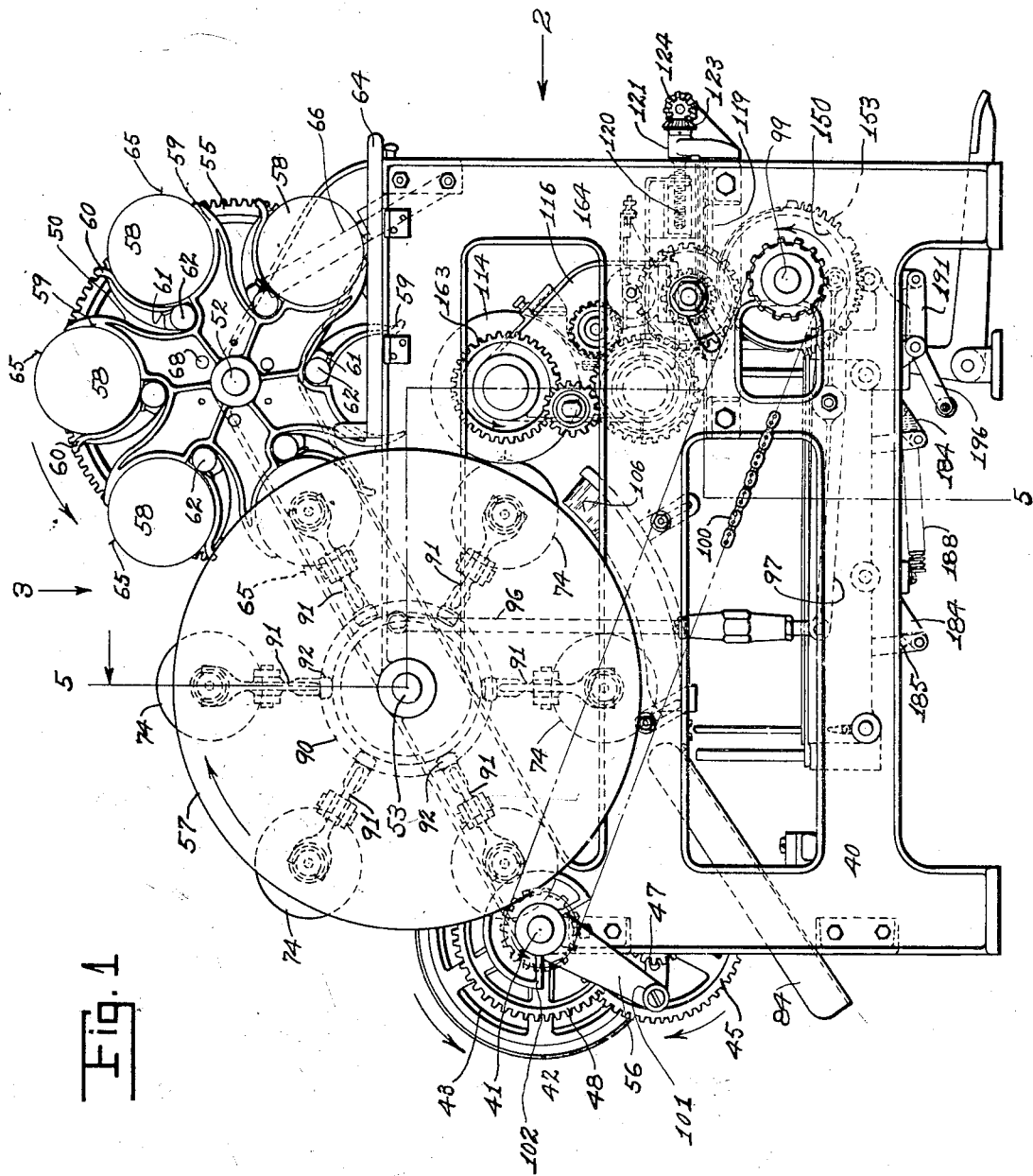

B. W. TUCKER.
MACHINE FOR APPLYING LABELS AND THE LIKE TO CANS AND OTHER ARTICLES.
APPLICATION FILED JULY 22, 1908.

961,270.

Patented June 14, 1910.

13 SHEETS—SHEET 1.

Witnesses
H. V. James
L. A. Compton

Inventor
Benjamin W. Tucker,
By his Attorney
Chas. C. Gill

B. W. TUCKER.
MACHINE FOR APPLYING LABELS AND THE LIKE TO CANS AND OTHER ARTICLES.
APPLICATION FILED JULY 22, 1908.

961,270.

Patented June 14, 1910.

13 SHEETS—SHEET 2.

Witnesses
G. V. James
L. R. Compton

Inventor
Benjamin W. Tucker,
By his Attorney
Chas. E. Gill

B. W. TUCKER.
MACHINE FOR APPLYING LABELS AND THE LIKE TO CANS AND OTHER ARTICLES.
APPLICATION FILED JULY 22, 1908.

961,270.

Patented June 14, 1910.
13 SHEETS—SHEET 3.

Fig. 3

Witnesses
G. V. James
L. R. Compton

Inventor
Benjamin W. Tucker,
By his Attorney
Chas. C. Gill

B. W. TUCKER.
MACHINE FOR APPLYING LABELS AND THE LIKE TO CANS AND OTHER ARTICLES.
APPLICATION FILED JULY 22, 1908.
961,270.
Patented June 14, 1910.
13 SHEETS—SHEET 4.
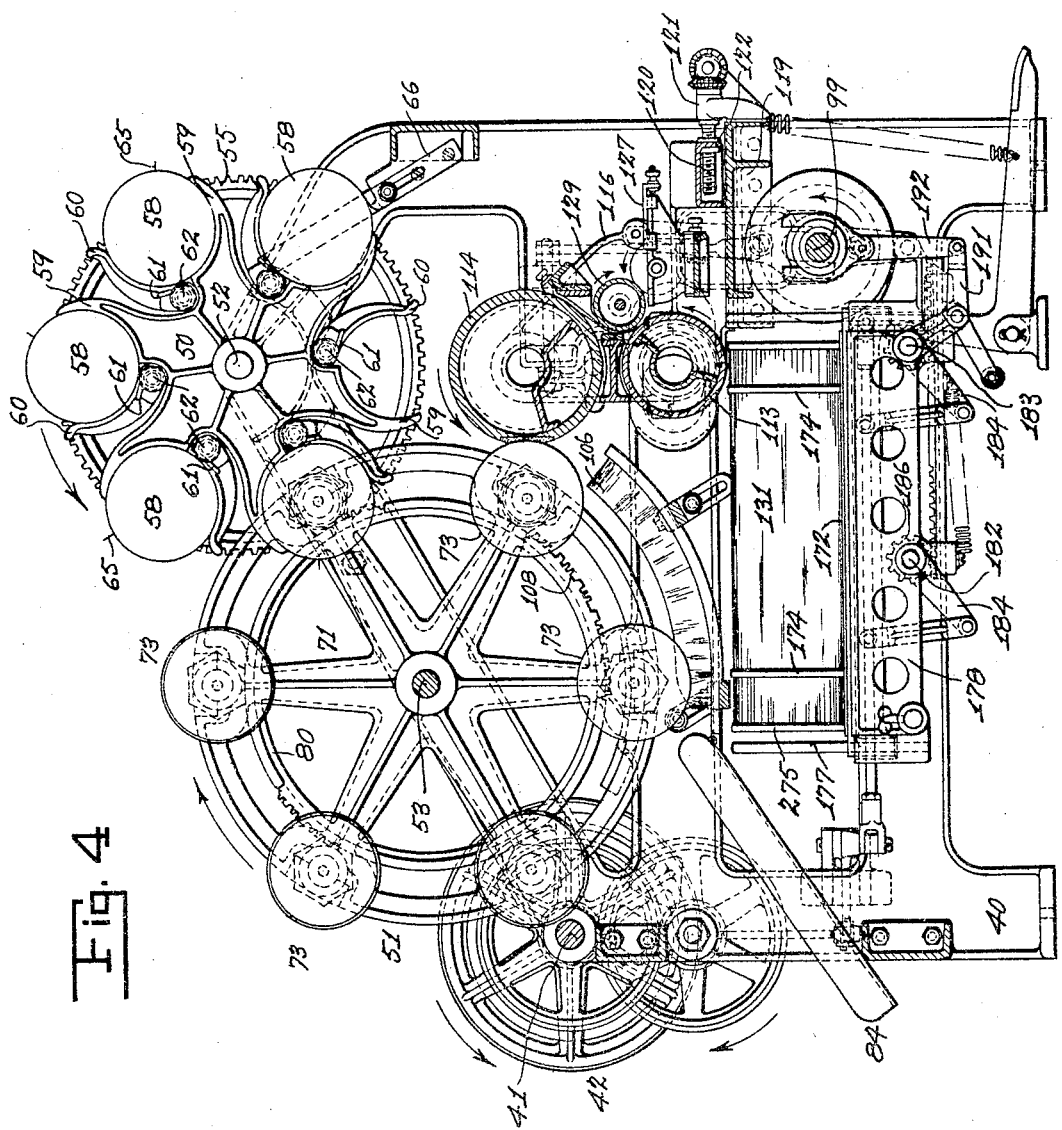

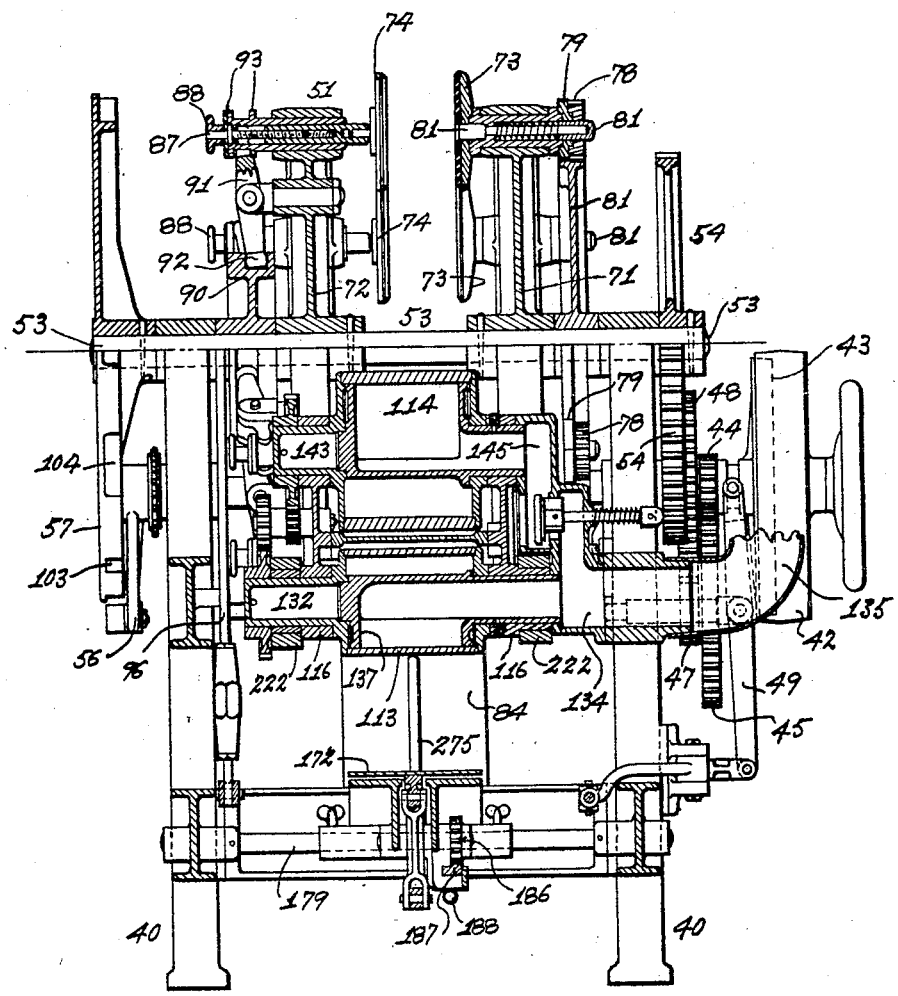

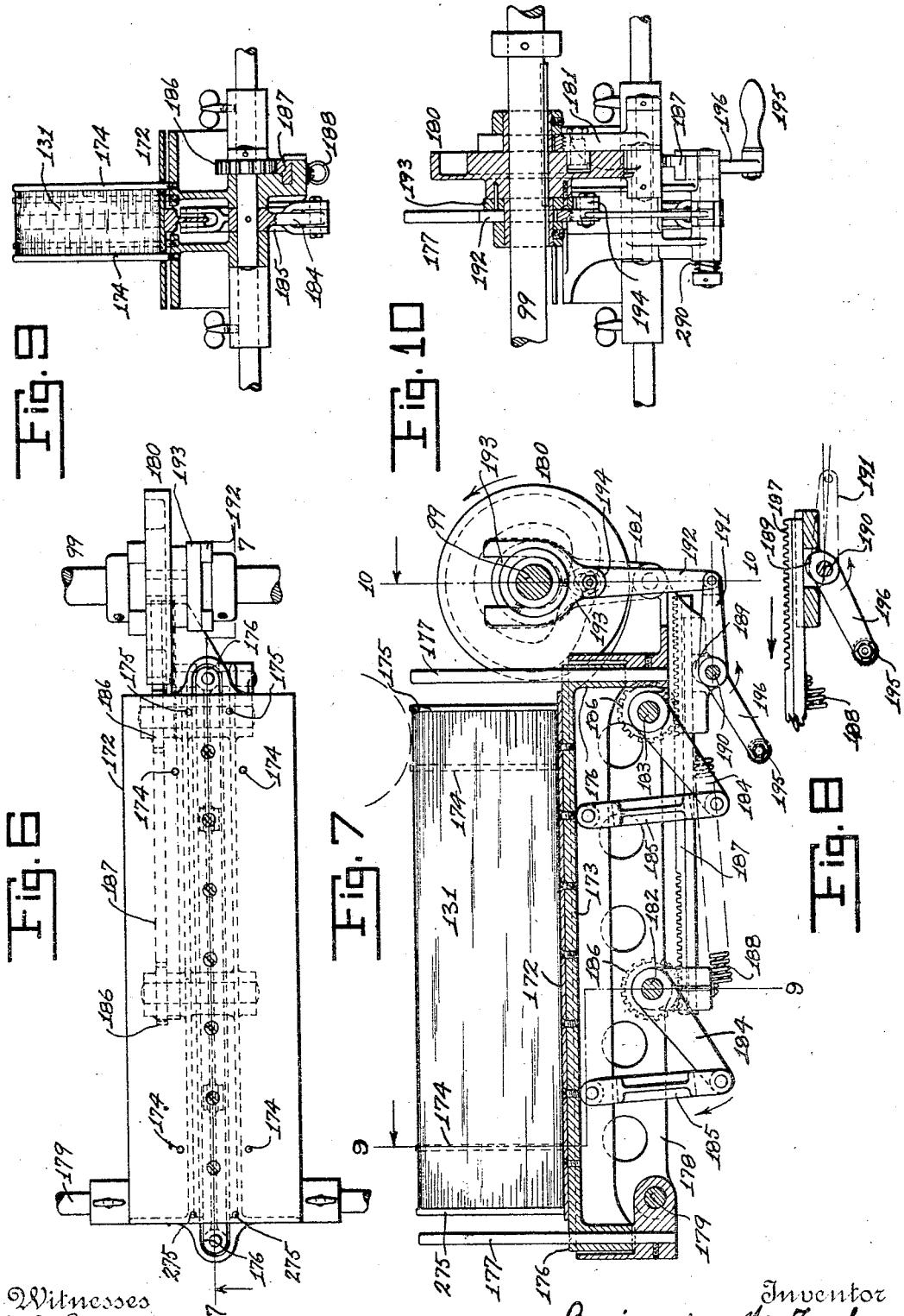

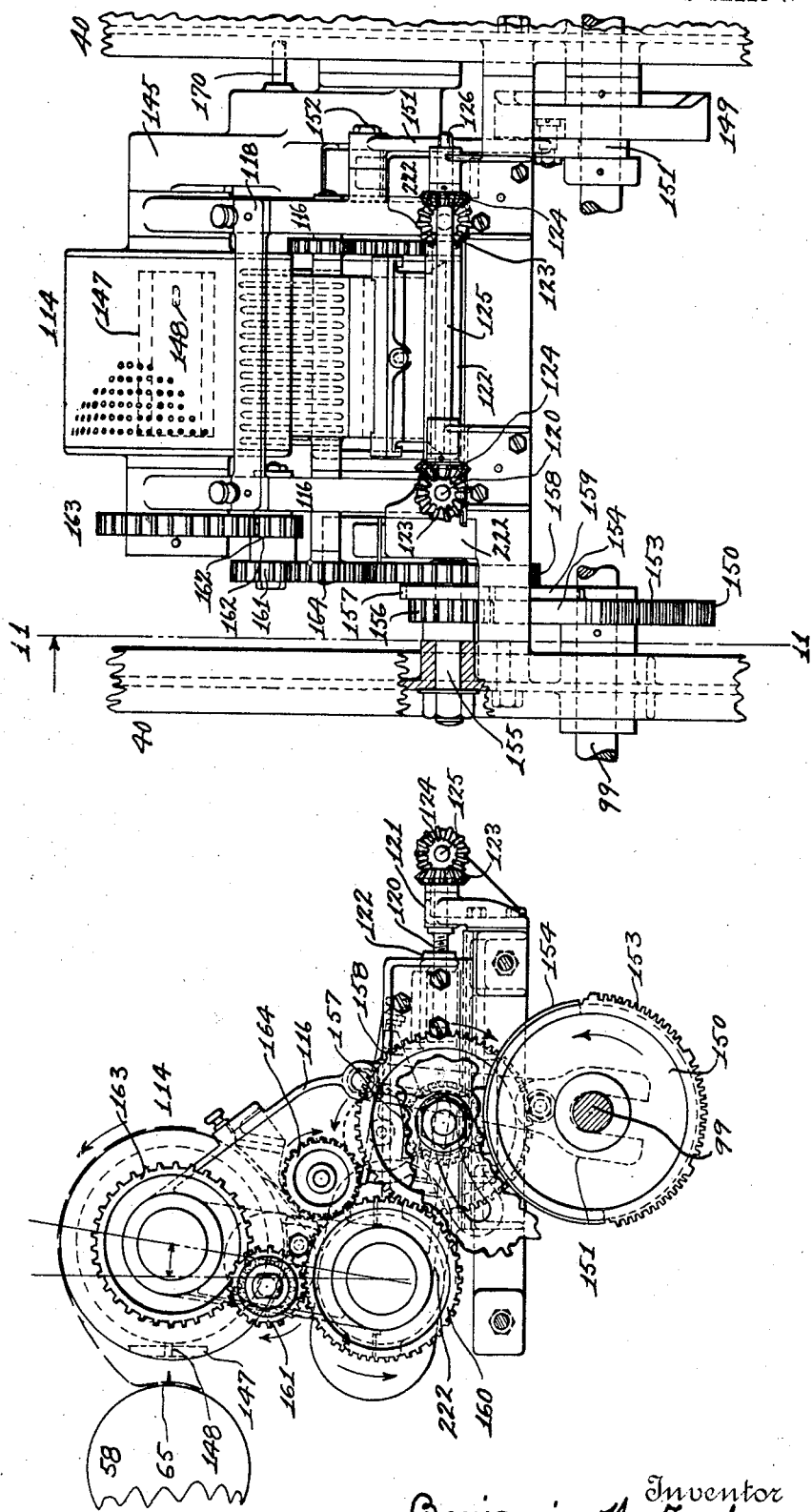

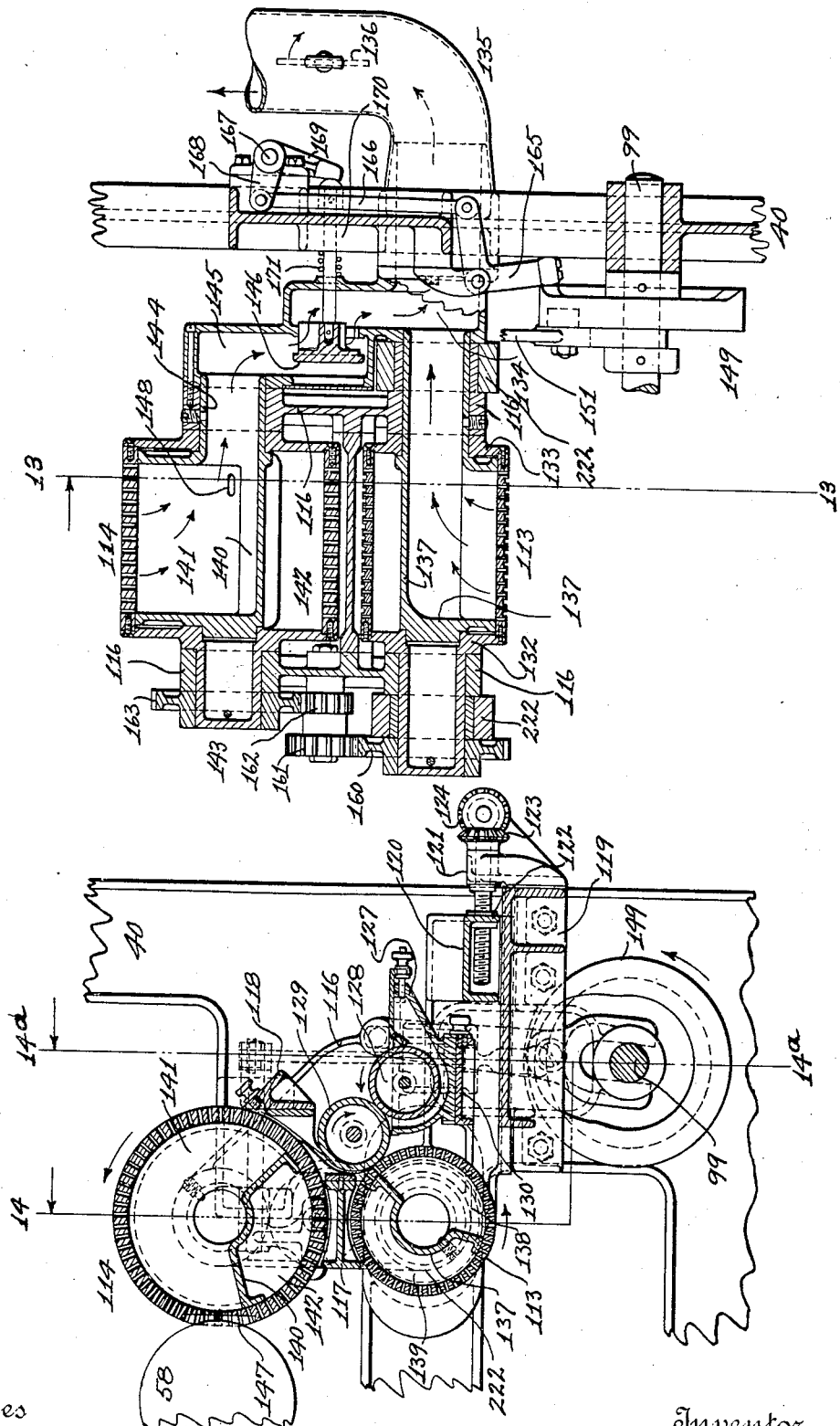

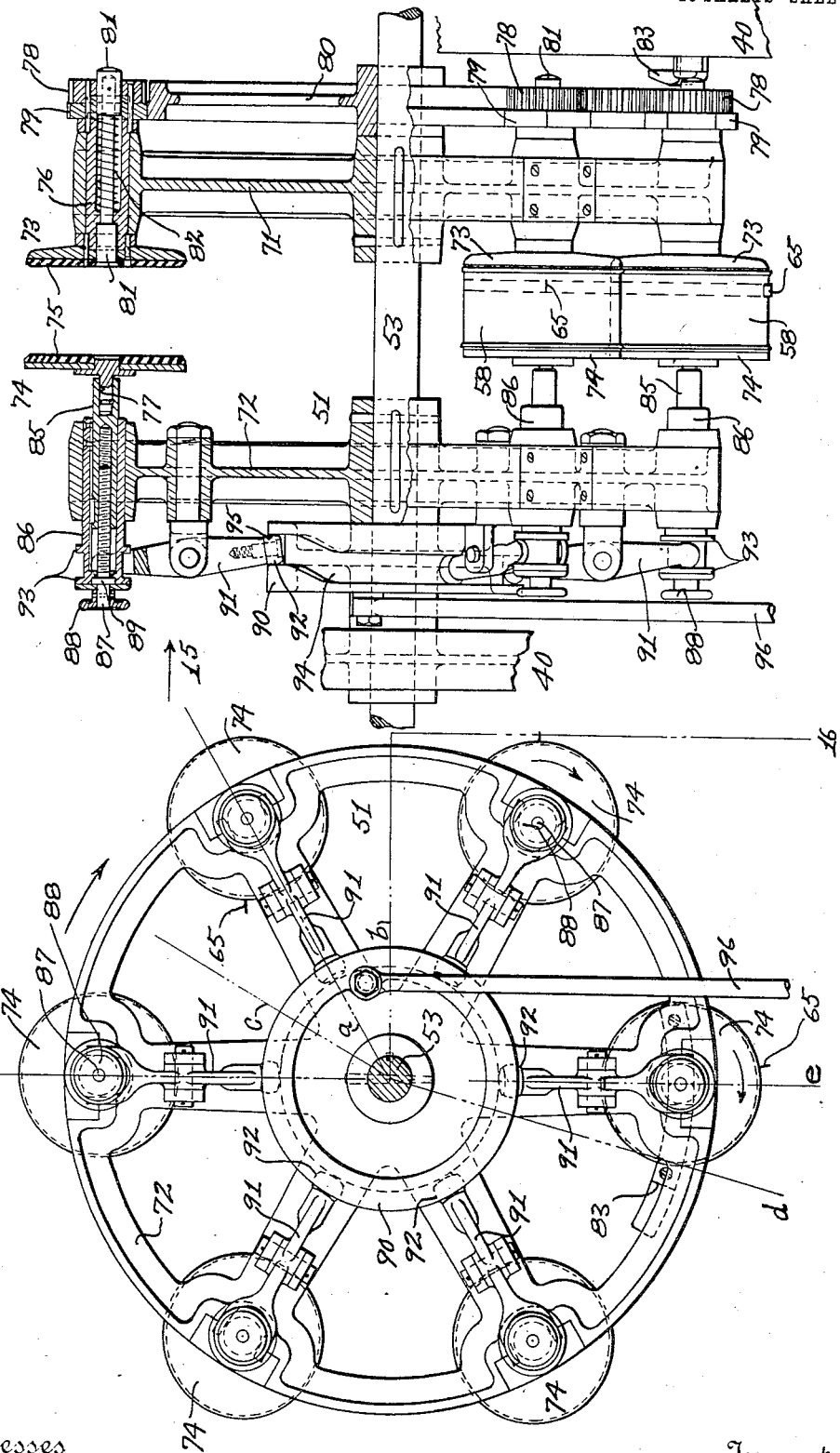

B. W. TUCKER.
MACHINE FOR APPLYING LABELS AND THE LIKE TO CANS AND OTHER ARTICLES.
APPLICATION FILED JULY 22, 1908.
961,270.
Patented June 14, 1910.
13 SHEETS—SHEET 10.
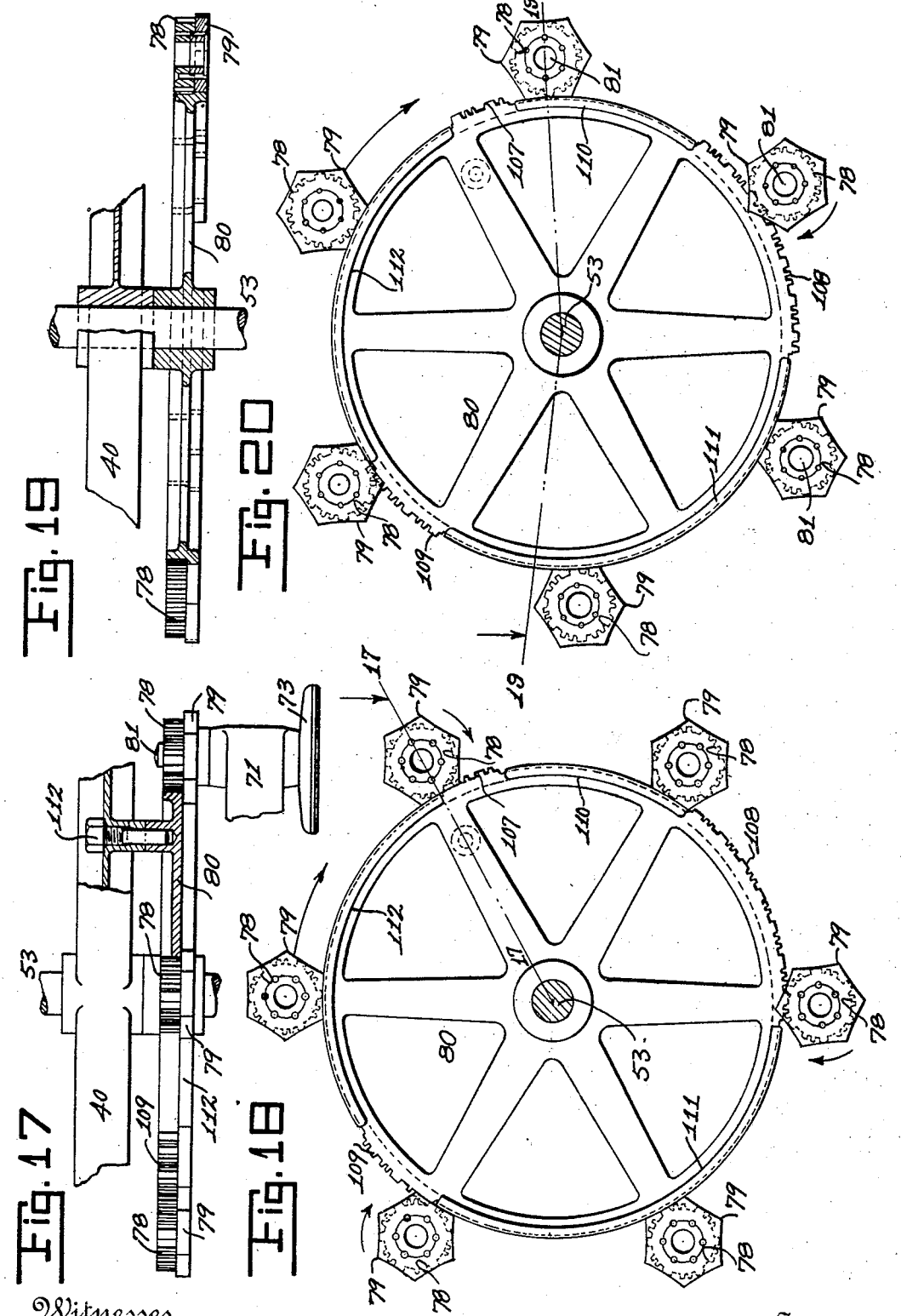
Witnesses
G. V. James
L. R. Compton
Inventor
Benjamin W. Tucker,
By his Attorney
Chas. C. Gill

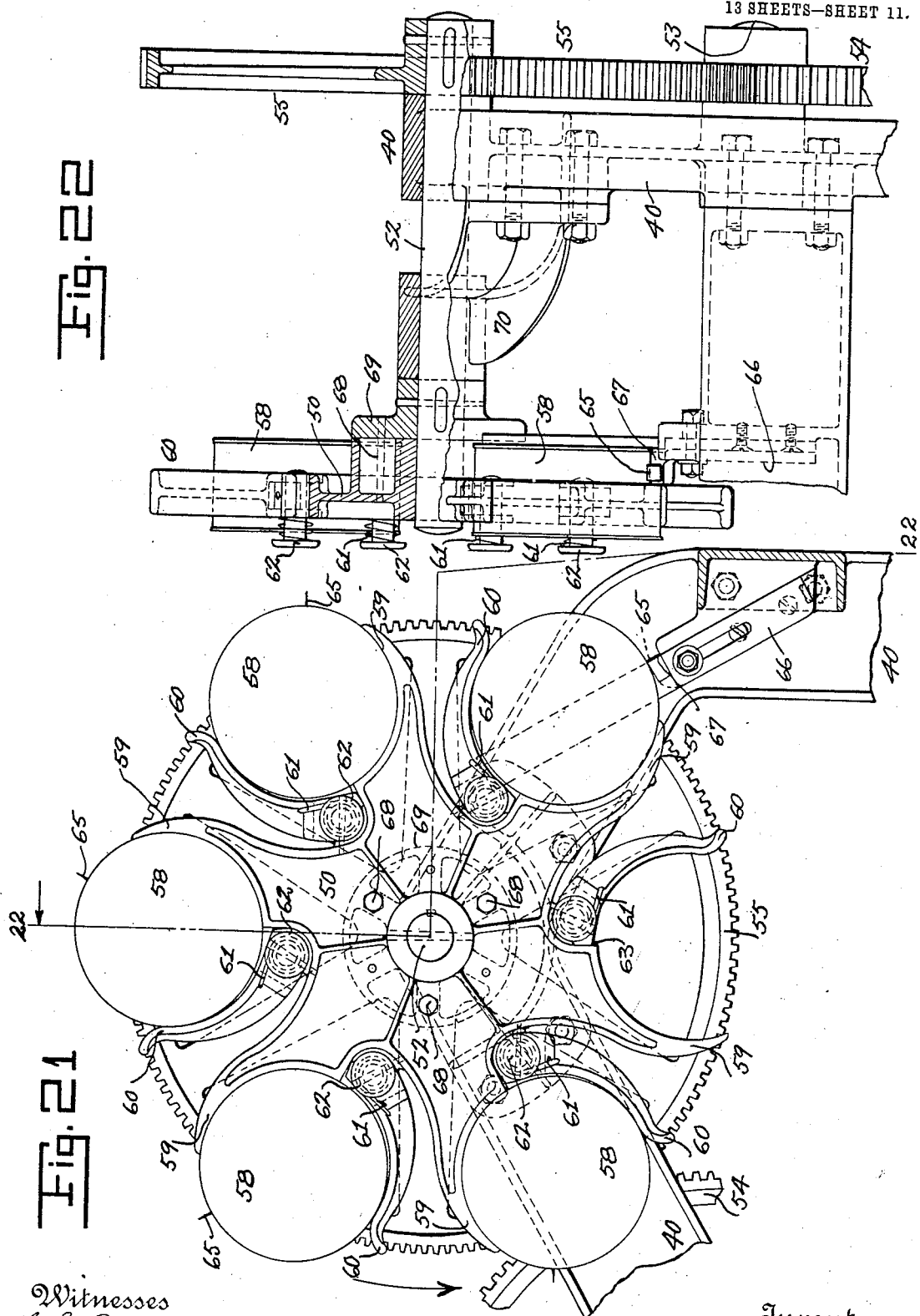

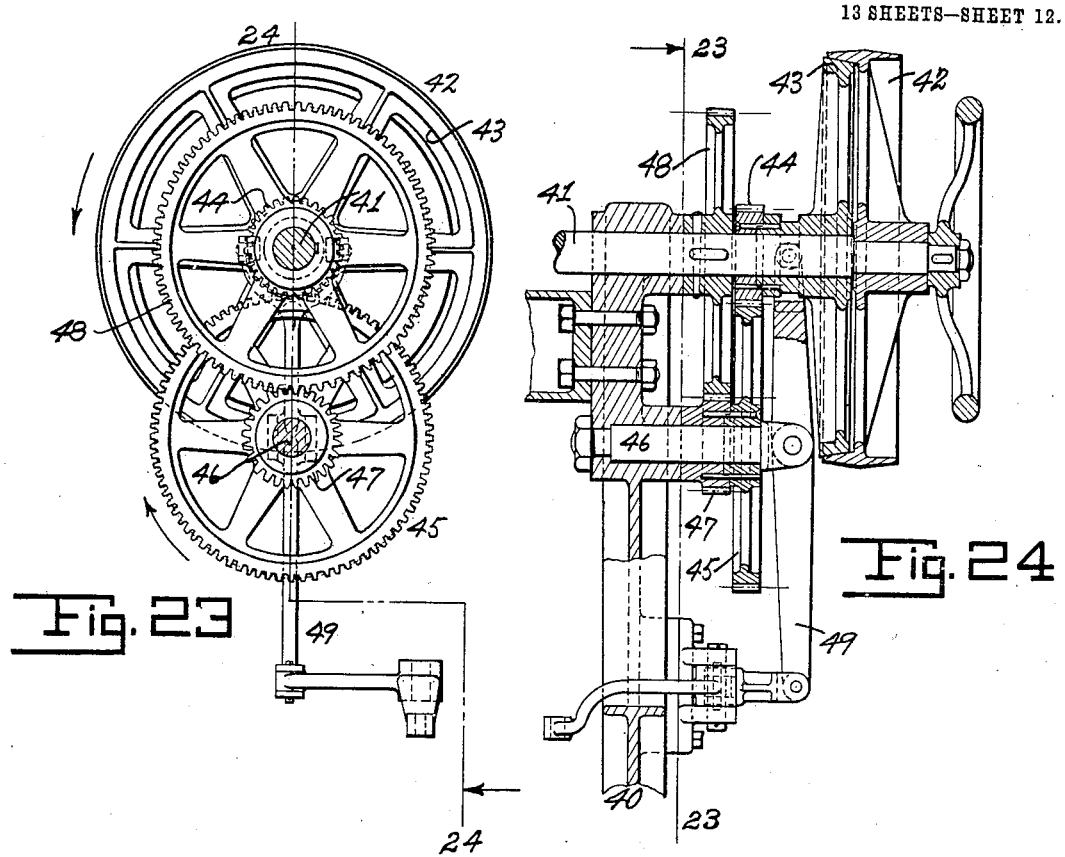
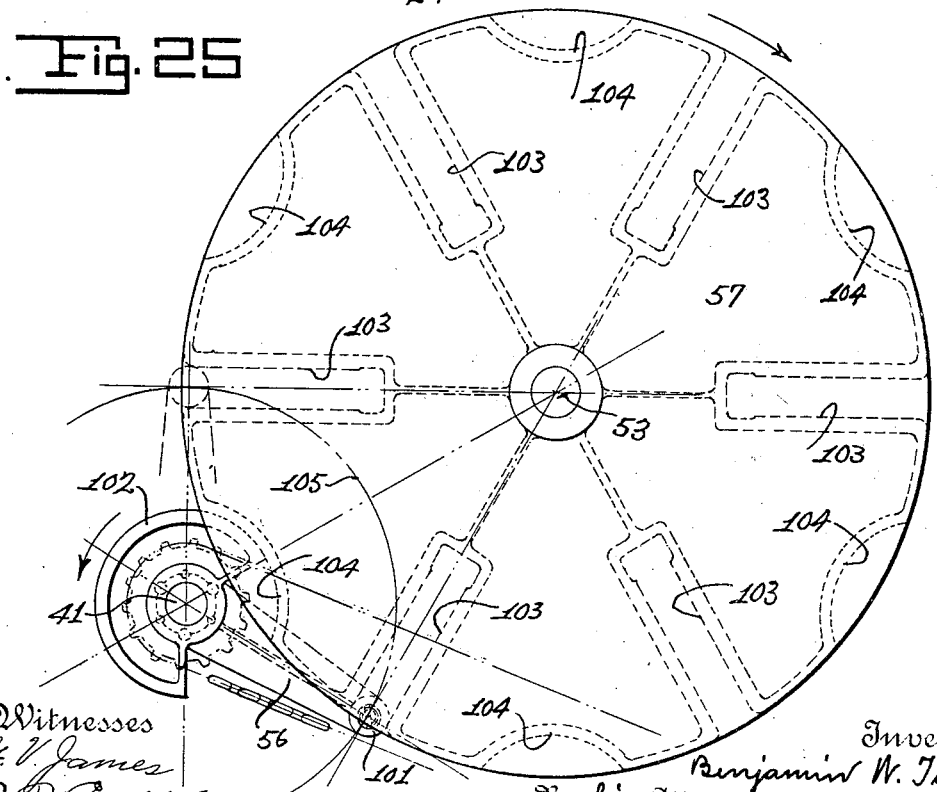

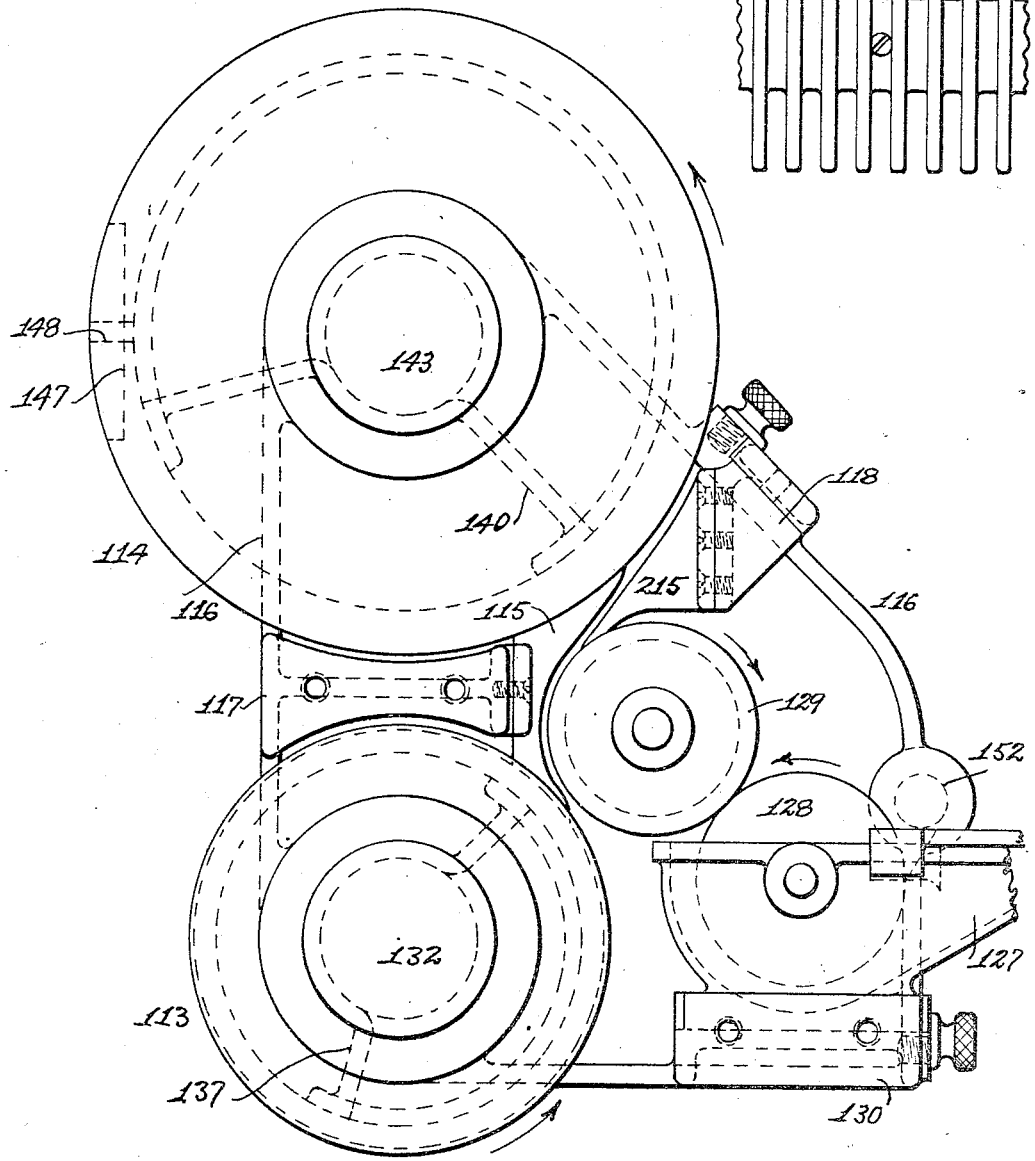

UNITED STATES PATENT OFFICE.

BENJAMIN W. TUCKER, OF SOUTH ORANGE, NEW JERSEY.

MACHINE FOR APPLYING LABELS AND THE LIKE TO CANS AND OTHER ARTICLES.

961,270.     Specification of Letters Patent.     Patented June 14, 1910.

Application filed July 22, 1908. Serial No. 444,714.

*To all whom it may concern:*

Be it known that I, BENJAMIN W. TUCKER, a citizen of the United States, and a resident of South Orange, in the county of Essex and State of New Jersey, have invented certain new and useful Improvements in Machines for Applying Labels and the Like to Cans and other Articles, of which the following is a specification.
The invention relates to improvements in machines for applying labels, wrappers or the like to cans and other articles, and it consists in the novel features, structure and combinations of parts hereinafter described, and particularly pointed out in the claims.

The machine of my invention, in its preferred embodiment, comprises a rotary feed-wheel or frame to the pockets of which the cans to be labeled are fed by hand and which carries said cans inwardly and surrenders them, one after another, to other features of the machine, a rotary clamp-frame which takes the cans one after another from said rotary feed-frame and carries them to the point of discharge from the machine and there releases them to pass down a discharge-chute from the machine, a label-holder for holding a stack of the labels to be applied to the cans while the latter are being carried through the machine by said clamp-frame, means for taking the labels one after another from said label-holder and delivering them to the cans, around which they are applied while the cans are held by said rotary clamp-frame, means for applying paste to said labels while they are in transit from the label-holder to the cans intended to receive them, a brush for effecting the smooth adherence of the labels to the cans, and means for timing the motions of the several parts of the machine for securing their coöperative action in carrying out the purposes of the invention.

Figure 2:
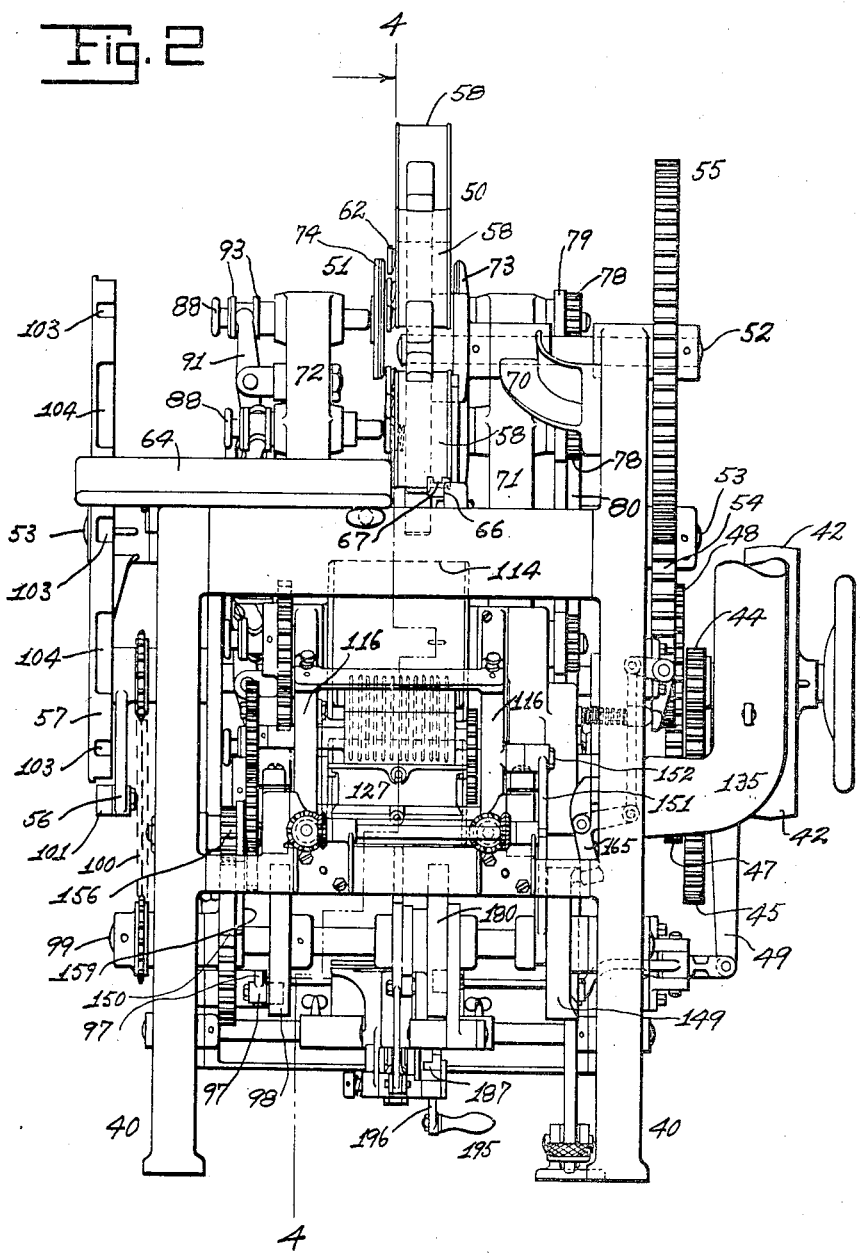

The invention will be fully understood from the detailed description hereinafter presented, reference being had to the accompanying drawings, in which:

Figure 1 is a side elevation of a can-labeling machine constructed in accordance with and embodying the invention; Fig. 2 is a front end view of the same, taken in the direction of the arrow "2" of Fig. 1; Fig. 3 is a top view of the same; Fig. 4 is a vertical longitudinal section through the same on the dotted line 4—4 of Fig. 2; Fig. 5 is a vertical transverse section of the same on the dotted line 5—5 of Fig. 1; Fig. 6 is a top view of the holder for the labels to be applied to the cans or other articles, with a portion of the mechanism for operating the same; Fig. 7 is a vertical longitudinal section of the same on the dotted line 7—7 of Fig. 6, the holder being shown as supporting a stack of the labels; Fig. 8 is a detached view, partly in section, of a portion of the mechanism employed for elevating the stack of labels as the latter are one by one removed from the upper end of the stack, so that the top label of the stack may always be in proper position to be taken up by the other mechanism of the machine; Fig. 9 is a vertical transverse section through the label holder and a portion of its mechanism on the dotted line 9—9 of Fig. 7; Fig. 10 is a vertical transverse section through a portion of the mechanism for the label holder, said section being on the dotted line 10—10 of Fig. 7; Fig. 11 is a detached sectional view (on the line 11—11 of Fig. 12) through a portion of the machine and presents in side elevation the gearing and parts operated therefrom represented mainly by dotted lines at the lower right hand portion of Fig. 1; Fig. 12 is a detached front elevation, partly in section, of the gearing and parts shown in Fig. 11, portions of the side frames of the machine having been added to Fig. 12; Fig. 13 is a vertical longitudinal section through a portion of the machine on the dotted line 13—13 of Fig. 14 and illustrates more particularly the perforated suction cylinders for transferring the labels, one after another, from the label holder to the cans and the means for applying paste to the labels during such transfer; Fig. 14 is a vertical transverse sectional view through that portion of the machine comprised in Fig. 13, the main portion of Fig. 14 being on the dotted line 14 of Fig. 13 and the extreme right hand portion thereof on the dotted line 14ª—14ª of Fig. 13; Fig. 15 is an enlarged detached side elevation of the rotary clamp-frame by which the cans are taken from the rotary feed frame to the location at which the labels are to be applied and which coöperates with other features of the machine in the application of the labels; the shaft carrying said clamp-frame is shown in section, and the cam by which the movable set of the clamp-members is controlled is shown on said shaft, said cam being free on the shaft and operable by a connecting rod shown connected with it; Fig. 16 is a front elevation, partly in vertical section, of the same, the two lower pairs of clamps being shown as holding cans between them and the top pair of clamps in an open position ready to pass into line with a can and embrace it at its ends; Fig. 17 is a top view, partly in section, on the dotted line 17—17 of Fig. 18, of a gear mechanism by which the pairs of can-clamps while being carried by or revolving with the clamp-frame are during certain portions of their revolution prevented from rotating on their own axes and during certain other portions of their revolution are compelled to rotate on their axes; Fig. 18 is a side elevation of the same; Fig. 19 is a horizontal section of the same on the dotted line 19—19 of Fig. 20; Fig. 20 is a side elevation of the same corresponding with Fig. 18 but showing the spindles of the can-clamps as having been carried by their frame to a different position on the large stationary gear and locking disk; Fig. 21 is an enlarged side elevation, partly broken away and partly in section, of the upper right hand portion of the machine as represented in Fig. 1 and is presented to illustrate the rotary feed-frame to which the cans are fed by hand and which carries the same to the location at which they are taken by the rotary clamp-frame; cans are illustrated in five of the pockets of the feed-frame; Fig. 22 is a front elevation, partly in section, on the dotted line 22—22 of Fig. 21, of the same; Fig. 23 is a vertical section, on the dotted line 23—23 of Fig. 24, showing the drive and clutch mechanism employed on the machine; Fig. 24 is a vertical transverse section of the same on the dotted line 24—24 of Fig. 23; Fig. 25 is an enlarged side elevation of the mechanism for imparting an intermittent rotary motion to the can clamp-frame and locking said frame stationary between its intermittent movements; Fig. 26 is an enlarged detached view showing in end elevation the means for conveying the labels, one after another, to the cans and applying paste to the labels during their travel, said means comprising a lower air-cylinder, an upper air-cylinder, a paste-applying roller, a bridge-frame intermediate the forward sides of said cylinders and over the outer curved face of which the labels travel from the lower to the upper air-cylinder while at the same time paste is being applied to them, and a frame having a series of fingers which strip the labels from the paste-roller and direct them on their upward course to the upper air-cylinder, by which said labels are conveyed to the cans; the air-cylinders, paste-rollers and receptacle, bridge-frame and stripper-frame shown in Fig. 26 are supported in a tiltable frame the outer side of which is omitted so as to disclose the parts enumerated more clearly; Fig. 27 is a detached front elevation of the bridge-frame shown in end elevation in Fig. 26, and Fig. 28 is a detached front elevation, partly broken away, of the frame which strips the labels from the paste-roller and directs them to the upper air-cylinder.

In the drawings, 40 designates the side frames of the machine, between which, at the rear portion of the latter, is mounted the driving shaft 41 from which the operative parts of the machine receive their motions and which may have power imparted to it, in a customary manner, through a belt wheel 42 (Fig. 24), clutch-disk 43, pinion wheel 44 carried by said clutch disk, gear-wheel 45 in engagement with said pinion-wheel 44 and mounted on a short shaft 46, pinion-wheel 47 connected with said gear-wheel 45, and gear-wheel 48 keyed on said driving shaft 41 and in engagement with said pinion-wheel 47. The clutch disk 43 is adapted to be moved toward or from the belt-wheel 42 by means of a usual shipper-lever 49.

In describing the structure of the operative parts of the machine, I will first refer to the rotary feed-frame 50 for receiving the cans and carrying them into the machine, and then the clamp-frame 51 which takes the cans from said feed-frame, the latter being secured on a shaft 52 and said clamp-frame on a shaft 53, from which motion is imparted to the shaft of the feed-frame 50 through the intermediate gear wheels 54, 55 (Fig. 3), the gear-wheel 54 being secured on one end of the shaft 53 and the gear-wheel 55 on the corresponding end of the shaft 52.

The clamp-frame 51 has an intermittent rotary motion imparted to it from the shaft 41 through an arm 56 (Fig. 25) secured on said shaft and a rotary radially slotted or grooved disk 57 secured on the shaft 53 and adapted to be actuated at regular intervals, as hereinafter explained, by said arm 56, and the motion of said clamp-frame is imparted to the feed-frame 50, through the gear-wheels 54, 55, whereby said feed-frame also has an intermittent rotary motion and said feed-frame 50 and clamp-frame 51 are caused to rotate toward each other, as indicated by the arrows in Fig. 1, the purpose being that the feed-frame 50 shall carry the cans, which I number 58, into the machine and that said cans shall, one after another, be taken by the clamps of the clamp-frame 51 and carried to the label-applying devices with which the clamp-frame coöperates.

The feed-frame 50 is secured on the shaft 52 which is mounted in the upper forward portion of the side-frames 40, as shown in Figs. 1 and 4, and said frame 50 (shown on an enlarged scale in Figs. 21 and 22) is in the form of a wheel having in its periphery a series of pockets or recesses adapted to receive the cans 58 and each comprising a fixed curved member 59 and a curved pivoted-member 60, said members in pairs operating to form pockets adapted to the cans 58 to be placed within the same. The pivoted members 60 have flexed against them projecting ends of coiled springs 61 which are wrapped upon the pins 62 by which said members 60 are pivotally secured to the frame 50. The springs 61 yieldingly press the pivoted members 60 to a limited extent toward the fixed members 59 of the pockets of the frame 50, and said members 60 are adapted, against the stress of the springs 61, to be pressed in a direction from said fixed members 59. The inner shank ends of the pivoted members 60 are adapted to abut against the frame 50 at the base of the fixed members 59, as shown at 63 in the lower portion of Fig. 21, so that the pockets for the cans 58 may never entirely close but remain at all times in a sufficiently open position to permit the cans to be pressed into them by hand, the pivoted members 60 yielding outwardly to admit the cans to said pockets and exerting a yielding force of sufficient strength against the cans when the latter are in the pockets, to prevent them from becoming accidentally displaced therefrom. The feed frame 50 will preferably be a casting and the movable members 60 thereof will preferably be castings and connected with the body of the frame by the pivot-pins 62.

At the front right-hand portion of the machine I provide a table 64 upon which the cans to be fed to the feed-frame 50 may be placed and from which the operator will take the cans, one after another, and place them in the pockets of the feed-frame 50 during the intervals that the latter is at rest between its intermittent rotary motions. Under some circumstances it will be unimportant to place the cans 58 in the pockets of the frame 50 in any special order, care being observed that they are all placed within said pockets so as not to slip therefrom, but in the drawings the cans 58 shown are formed around their body with a weakened strip of metal 65 having a projecting tongue or end which, in the use of the cans, is to enable the separation of the can into two parts for the purpose of opening the same, a customary key being applied to the tongue end of the strip 65 and twisted or wound, in a well-known manner, for detaching the weakened strip from the body of the can. Many meat-cans possess the weakened strip of metal 65 having the tongue end, which end must be projected through the label to be applied upon the cans, and when cans of this special character are fed to the present machine, care must be exercised in introducing the same to the pockets of the feed-frame 50 so that the projecting ends of the strips 65 may pass into proper register with other features of the mechanism, hereinafter described, for permitting said ends to be properly projected through the labels as the latter are applied to the cans, and to this end I provide the machine, adjacent to the table 64, with a bar 66 having a shoulder 67 (Fig. 21) which I term an index and against which the projecting end of the strip 65 of a can fed to the frame 50 will be placed, as shown at the lower right hand portion of Fig. 21 and as also represented in Fig. 22. The shoulder 67 forms a certain guide to the operator in introducing the cans, one after another, to the frame 50, and when the projecting ends of the weakened strip 65 of the cans are placed against said shoulder 67 on the introduction of the cans, one after another, to the frame 50, said projecting ends will pass into proper register with the means, hereinafter described, for applying the labels to the cans and enable said projecting ends to be driven through said labels, so that the cans, as completely labeled, will expose said projecting ends at the outer side of said labels.

The feed-frame 50 is secured by screws 68 to a hub 69 (Fig. 22) which is pinned to the shaft 52, and the latter is mounted in a suitable bearing 70 (Figs. 3 and 22) extending from the side frame 40 and also in a bearing formed in said side frame, the outer right hand end of the shaft 52 being extended beyond said side frame 40 and having secured upon it the gear wheel 55, hereinbefore referred to and by means of which motion is communicated to said shaft 52 for rotating the frame 50.

The clamp-frame 51 which withdraws the cans 58, one after another, as said cans attain the proper position, from the feed-frame 50, comprises two disks 71, 72 (shown in greater detail in Figs. 15 and 16) which are secured on the shaft 53 and which carry clamps 73, 74 in pairs adapted to embrace the ends of the cans 58 and at the proper time withdraw them from the frame 50. In the construction shown, the frame 50 is formed with six pockets to receive the cans 58, and hence the clamp-frame 51 is provided with six pairs of the clamps 73, 74, which clamps are in the form of disks, preferably faced with rubber 75 (Fig. 16), and mounted on spindles 76, 77, respectively, extending horizontally in line with each other at the peripheral portions of the disks 71, 72. The spindles 76 are in the form of hollow sleeves having a bearing in the peripheral portion of the disk 71 and the clamps 73 are secured to the inner ends of the spindles 76, while upon the outer ends of said spindles are secured pinion wheels 78 and polygonal blocks 79, said pinion wheels and blocks being more clearly illustrated in Figs. 17 to 20 inclusive and pinned together and to the spindles 76. The pinion wheels 78 and blocks 79 are shown as separately made and then pinned together for convenience of manufacture, but may, of course, be in integral pieces. The purpose of the pinion wheels 78 and blocks 79 is to coöperate with a stationary wheel 80 to effect, at the proper times, the rotation of the spindles 76 and clamps 73, and at all other times to hold said clamps 73 against rotation, as will presently be described.

Within the spindles 76 for the clamps 73 I provide plungers 81 (Fig. 16), the inner ends of which plungers are adjacent to the outer faces of the clamps 73 and the outer ends of which project slightly outwardly beyond the vertical plane of the pinion wheels 78, and said plungers are encompassed by springs 82, confined within the spindles 76, which normally act to hold said plungers in their initial position shown in Fig. 16. The plungers 81 are employed to, at the proper time, insure the discharge of the cans from the rubber facing of the clamps 73. At the proper time in the rotation of the clamp-frame 51, the clamps 74 separate from the clamps 73 to release the cans held between them and at this time the outer end of the plunger 81 of the clamp 73 intended to release a can will be carried against the inclined surface of a cam 83 (Figs. 15 and 16) and be thereby pressed inwardly, whereby the inner end of the plunger is caused to press the can from its engagement with the rubber face of the clamp 73. Ordinarily the weight of the can, when it is released by the separation of a clamp 74 in a direction from the clamp 73, will cause the can to become released from said clamps and descend upon the discharge chute 84 (Fig. 1), but since it is preferable to face the clamps 73 with rubber and since there may be lacquer or other adhesive substance on the head of the cans which might cause them to adhere to the rubber facing, I prefer to employ the plungers 81 to safeguard the detachment at the proper time of the cans from the clamps. The cam 83 is located at the point at which the clamp frame 51 is to discharge the labeled cans and it is in the path of all the plungers 81, but, as is obvious, only operates on the plungers, one at a time, as they reach said point at which the cans are to be discharged.

The spindles 77 for the clamps 74 are, as shown in Fig. 16, short and rotatably held within adjustable slides 85, which are held within sleeves 86 mounted within bearings in the periphery of the disk 72. The slides 85 are internally threaded and receive screws 87 by which said slides and the clamps 74 carried by them may be initially adjusted toward or from the clamps 73 in accordance with the length of the cans or other articles to be labeled. The screws 87 are provided with heads 88 by which they may be turned to adjust the slides 85 and also with annular shoulders 89 (Fig. 16) rotatably held within the outer portion of the sleeves 86, the shoulders 89 operating to prevent longitudinal movement of the screws 87 during the turning of the latter for longitudinally adjusting the slides 85. The spindles 77 of the clamps 74 are rotatably held in the ends of the slides 85, and hence said clamps may, when so impelled from the clamps 73 and cans held by the clamps, rotate on their own axes, said slides 85 and sleeves 86 having no rotary movement, but simply a longitudinal movement in unison toward and from the clamps 73 during the operation of the machine. The initial longitudinal adjustment of the slides 85 within the sleeves 86 has no tendency to move said sleeves.

During the operation of the machine the clamps 74 are, one after another, moved in a direction toward the clamps 73 at the point at which it is desired to engage a can held by the feed-frame 50 and withdraw the same therefrom, and the clamps 74 which, with the clamps 73, are holding cans, are one after another moved outwardly in a direction from said clamps 73 at the point where the cans, after having been labeled, are to be released and permitted to discharge from the machine,—that is pass down the discharge chute 84. Except when the clamps 74 are moving inwardly to engage a can or are with their complemental clamps carrying cans from the feed-frame 50 to the point of discharge, said clamps 74 are held in their outer position shown at the upper part of Fig. 16, the clamps 74 at the lower portion of Fig. 16 being represented at their inward position in engagement with cans 58. The means for controlling the movement and position of the clamps 74 comprise a cam-wheel 90 (Figs. 1, 3, 5, 15 and 16) freely mounted on the shaft 53 and a set of substantially centrally pivoted levers 91 carried by the disk 72 and radially disposed with respect thereto, the inner ends of said levers being provided with rollers 92 confined within the peripheral groove of the cam 90 and at their outer ends being bifurcated to straddle the outer ends of the sleeves 86 and engage opposite annular flanges 93 formed thereon. The groove of the cam 90 by the contact of its side edges with the rollers 92 of the levers 91 controls the position of said levers and through them of the sleeves 86 and clamps 74. When the outer ends of any of the levers 91 are moved inwardly by the cam 90, the clamps 74 will be carried against the cans then in position to be engaged by the clamps 73, 74, and when the inner ends of said levers 91 are moved inwardly by the cam 90 the outer ends thereof move outwardly and withdraw the clamps 74 from the cans.

The cam 90 has a continuous groove in its periphery, one section 94 of which groove sets outwardly from the other and inner section 95 thereof, as shown in Figs. 3 and 16, and those levers 91 whose inner ends are within the inner section 95 of the cam-groove, have their outer ends held in an outward position, with the clamps 74 connected with them held in their receded or inoperative position, as shown at the upper portion of Fig. 16, and those of the levers 91 whose inner ends are in the outer section 94 of the cam-groove have their outer ends held inwardly with the clamps 74 connected with them bound against the cans 58, as shown at the lower portion of Fig. 16. During the rotation of the clamp-frame 51 the inner ends of the levers 91 may travel along the groove of the cam 90 when the latter is not rotating with said clamp frame. The cam 90 is not connected with the clamp-frame 51 but at the proper time has a limited rotary movement imparted to it through the rod 96 (Figs. 15 and 16) for enabling the release of a finished can at the discharge chute 84 and the clamping of the can presented by the feed-frame 50. In Figs. 1, 15 and 16 the rod 96 is shown in its upper position, with the feed-frame 50 and clamp-frame 51 at rest, the upward movement of the rod 96 having turned the cam 90 to effect the clamping of the can 58 presented to the clamp-frame by the feed-frame, as shown in Fig. 1. The upward movement of the rod 96 to its position shown in Figs. 1, 15, 16 resulted in the inclined or deflected surfaces shown in Fig. 16 at the upper part of the groove in the cam 90 being carried along the inner end of the lever 91 of the clamp 74 intended to grip the can presented by the feed-frame 50, the movement of said inclined surfaces of the cam-groove against said lever causing the inner end of said lever to move outwardly to the outer section 94 of the cam-groove and its outer end to be thereby forced, with its clamp 74, inwardly or toward the opposing clamp 73, said clamp 74 thus being forced against the can and with said clamp 73 gripping the same. The can having been gripped between the said clamps 74, 73, while the feed-frame 50 and clamp-frame 51 are at rest, the next step will be to start the clamp-frame and feed-frame in rotation. In the present machine the feed-frame and clamp-frame come to a stop at the end of each one-sixth of a full rotation, and in the timing of the present machine I allow the clamp-frame to perform about one-fourth of one-sixth of a rotation while the cam 90 remains at rest with the rod 96 in its upper position shown in Figs. 1, 15 and 16, and thereupon I pull the rod 96 downwardly, this causing the cam 90 to rotate to a limited extent in the same direction with the clamp-frame 51. This downward movement of the rod 96 ceases when the lower end of the inclined or deflected surfaces connecting the sections 94, 95 of the cam groove (shown at the upper part of Fig. 16) reach the dotted line $b$ in Fig. 15; the top or upper end of the said inclined surfaces will then be at the dotted line $a$ of Fig. 15, and the rod 96 and cam 90 will then remain at rest until the clamp-frame 51 has completed its one-sixth of a rotation and come to a stop. At this time the feed-frame 50 will have presented another can to the clamp-frame and the rod 96 is then pushed upwardly to turn the cam 90 in a reverse direction or toward the left (looking at Fig. 15) for the purpose of moving the upper inclined portions of the cam-groove from position between the dotted lines $a$, $b$ of Fig. 15 to position between the dotted lines $a$, $c$ of Fig. 15, thereby, as before, causing the cam to act against the lever 91 of the clamp 74 then in line with the can presented by the feed-frame 50, the action being to cause said clamp to clamp against the said can. The rod 96 will be allowed to remain in its upper position with the inclined portions of the cam groove between the lines $a$, $c$ until the clamp-frame has again started in motion and performed about one-quarter of one-sixth of its rotation, and thereupon the rod 96 will be pulled downwardly again to carry the said inclined portion of the cam groove to position between the dotted lines $a$, $b$ of Fig. 15, as before. The upward movement of the rod 96 is to effect the gripping of the can then presented by the feed-frame 50 to the clamp-frame 51.

The cam 90 is likewise provided at its lower portion with inclined surfaces corresponding with those shown at the upper part of Fig. 16, said inclined surfaces leading from the outer to the inner sections of the cam-groove, and the said lower inclined surfaces, when the rod 96 is pushed upwardly to effect the gripping of a can, lie between the dotted lines $d$, $e$ of Fig. 15, where, during the first portion of each movement of the clamp-frame 51 (with the cam 90 at rest), said surfaces effect the inward movement of the lower lever 91 riding against them and the outward movement of the clamp 74 carried by it, this outward movement of the clamp 74 releasing the can and permitting it to fall into the discharge chute 84. During the outward movement of the lower clamp 74, as just above described, the cam 83 operates to aid in ejecting the can, said cam 83 acting against the stem of the clamp 73 in line with the said lower clamp 74. When the rod 96 is pulled downwardly and the upper inclined surfaces of the groove of the cam 90 are between the dotted lines $a$, $b$ of Fig. 15, the lower inclined surfaces of said cam groove will extend to the left of the dotted line *d* of Fig. 15.

The rod 96 which operates the cam 90 has a vertical movement imparted to it from a rocking-lever 97 (Fig. 1) which extends forwardly from the rod 96 and is actuated by a cam 98 (Fig. 2) secured on the shaft 99 mounted in the side-frames 40, the forward end of the rocking-lever 97 carrying a roller which enters a groove in the left hand face of said cam 98. The shaft 99 has motion imparted to it through the sprocket chain 100 from the shaft 41, said shafts 99, 41 having sprocket wheels, as shown in Figs. 1 and 2, to receive and engage said chain 100.

The means for imparting intermittent rotary motion to the clamp-frame 51 comprises, as hereinbefore described, the disk 57 secured on the left hand end of the shaft 53 of said frame and the crank-arm 56 secured on the shaft 41. The disk 57 and crank-arm 56 are more clearly illustrated in Figs. 1, 2, 3 and 25. The crank-arm 56 is provided on its outer end with a roller 101 and at its shank end is formed with an arc-flange 102, the latter of which, when in engagement with the disk 57, locks the latter stationary, while when the arm 56 is carrying its roller 101 against said disk, the latter is compelled to perform its rotary movement. The disk 57 is formed in its inner face with a series of radial recesses or slots 103 which are open at their outer ends, and said disk in its periphery is formed with a series of arc-shaped recesses 104, there being one recess 104 centrally between each two of the slots 103, and there being as many slots 103 as there are pairs of clamps carried by the clamp-frame 51. During the rotation of the shaft 41 the crank-arm 56 is carried along the path indicated by the dotted line 105 in Fig. 25 and during this movement the roller 101 will in succession enter the slots 103 as the latter pass into line with said path, as shown at the lower part of Fig. 25, and cause said disk to have a rotary movement, the roller 101 while traveling its path moving inwardly into a slot 103 of the disk 57 and finally at the end of the rotary movement of said disk leaving said slot, as denoted by the dotted lines at the left hand side of Fig. 25. During the travel of the roller 101 against the walls of a slot in the disk 57, the latter will be continued in motion, and when the roller 101 leaves the slot of said disk, as shown at the left hand side of Fig. 25, said disk will come to rest. As the roller 101 leaves in succession the slots of the disk 57, the arc-flange 102 connected with the crank-arm 56 passes successively into engagement with the walls of the recesses 104 in said disk and thereby serves to lock the disk against movement, said arc-flange 102 remaining in a recess of the disk during the period that the crank-arm 56 is traveling its path without being in contact with said disk and moving free of the recess of said disk during the period that the crank-arm is in engagement with and rotating said disk. The crank-arm 56 and disk 57 are thus utilized for imparting from the shaft 41 an intermittent rotary motion to the clamp-frame 51, and the arc-shaped flange 102 is employed to coöperate with the walls of the recesses 104 in said disk 57 in locking the clamp-frame stationary at the end of each of its intermittent movements.

I have hereinbefore referred to the fact that during a portion of the intermittent rotary movement of the clamp-frame 51, the clamps 73 have a rotary motion imparted to them and communicate this rotary motion to the cans and clamps 74 then in coöperative relation or bound together, the rotary movement being imparted to the clamps 73 by means of the pinions 78 fastened on the spindles 76 of said clamps and their engagement with gear teeth on the stationary wheel 80. I impart rotary motion to the clamps and cans held by them mainly for the purpose of causing the labels to be wrapped around the cans, as hereinafter explained, and for moving the surfaces of said cans with the labels on them against the concave brush 106 held in the path thereof, said brush serving to cause the labels to present a smooth finished appearance when the cans leave the machine. The means for rotating the clamps 73 during the intermittent movements of the clamp-frame 51 are more clearly illustrated in Figs. 16 to 20 inclusive, Fig. 18 showing the relation of the parts in the starting position of the machine.

The pinion wheels 78 are connected with polygonal blocks 79, and the stationary wheel-frame 80 is shown as provided with three sections of gear-teeth numbered 107, 108 and 109, respectively; and also with segmental flanges 110, 111 and 112, said gear-teeth being at adjoining ends of said flanges. The flanges 110, 111 and 112 permit the polygonal blocks 79 to ride on them, and when said blocks are on said flanges they prevent the rotation of the spindles 76 of the clamps 73. When during the rotation of the clamp-frame 51 the pinion-wheels 78 are carried against the gear-teeth 107, 108 and 109, said pinion-wheels and the spindles 76 and clamps 73 connected with them will have a rotary motion imparted to them, and when the pinion-wheels 78 leave the said gear-teeth of said wheel 80, the blocks 79 connected with the pinion-wheels will engage the flanges of said wheel 80 and hold the clamps 73 against rotation. If the cans to be labeled are cylindrical and not formed with the weakened strip 65 having a projecting tongue, the stationary gear-wheel 80 would only need to have the gear-teeth 108, since these would be sufficient to enable the rotation of the can into its label and against the brush 106, but when cans 58, having said strip 65, are to be labeled, I also provide the wheel 80 with gear-teeth 107, to rotate the clamps whose pinion-wheels 78 engage the same for the purpose of positioning the projecting tongue of the strip 65 with respect to the label applying devices, hereinafter described, so that said tongue may be projected through the labels, said tongue by reason of the rotation of the can by said gear teeth 107 being turned from the position in which it is shown at the upper right hand side of Figs. 1 and 15 to the position in which it is shown in Fig. 11. The gear-teeth 109 are useful chiefly only when the clamps 73 are polygonal in outline to engage correspondingly-shaped cans and they are then used for restoring the clamps and their spindles to an initial relation so that they may in such relation always arrive at the point at which the clamp-frame 51 is to take the cans from the feed-frame 50. When the clamps 73 are circular in outline and intended to engage cylindrical cans, the gear-teeth section 109 is substantially unimportant, except for the fact that some of the gear-teeth of the wheel-frame 80 are of double width and some of the spaces between the teeth of the pinion-wheels 78 are of double width to engage said teeth, it then being desirable that said pinion wheels be restored to their exact initial position before being caused to engage the gear teeth 107, but if the clamps 73 were polygonal in outline and intended to set into the usual polygonal recess in the heads of cans, it would be essential that said clamps be returned to their initial position by the gear-teeth section 109 on the stationary wheel 80, so that at the point where the clamp-frame 51 withdraws the cans from the feed-frame 50, said clamps 73 might properly engage said cans. The gear-teeth sections 107, 108 and 109 are provided with teeth of double width at their starting ends to readily withstand the strain of starting the clamps 73 (and the clamps 74 when the cans are between said clamps) in rotation. The means for holding the wheel 80 stationary consists of a bolt 112 (Fig. 17) which passes through the side-frame 40 and enters a socket formed in said wheel.

The means for conveying and directing the labels one after another to the cans carried by the clamp frame 51 comprise (Figs. 13, 14, 26, 27, 28) a perforated cylinder 113 connected in one section of its interior with a source of air suction, a perforated cylinder 114 also connected in one section of its interior with a source of air suction, a frame 115 (Figs. 26, 27) which serves to guide the labels from the cylinder 113 upwardly to the cylinder 114, and a frame 215 which strips the labels from the paste roller 129 and directs them to the said roller 114. The cylinders 113 and 114 are rotatably mounted in the side frames 116 which are connected by transverse bars 117 and 118, and the frame thus constructed is mounted upon a transverse bed plate 119 supported between the main side frames 40 of the machine and is adapted to be adjusted on said plate 119 by means of screws 120 which extend inwardly through hubs 121 and at their inner portions engage threaded openings in the front section 122 of a frame composed of said section 122 and two side members 222 which extend rearwardly and are apertured to receive and thereby pass around the trunnion-like end sections (Figs. 13, 14) of the air cylinder 113. The frame composed of the transverse front section 122 and side sections 222 constitutes an adjusting frame mounted and capable of being slid on the bed-plate 119 for adjusting the position of the frames 116 carrying the cylinders 113 and 114. The outer ends of the screws 120 have rigidly secured on them bevel gear wheels 123 which are in mesh with bevel gear wheels 124 secured on a transverse shaft 125 (Fig. 12) whose right hand end 126 is adapted to receive a key or wrench by which said shaft and the gear wheels 124 carried thereby may be rotated. Any rotary motion of the gear wheels 124 will be communicated by the gear wheels 123 to the screws 120, with the result that said screws will effect the longitudinal movement or adjustment of the section 122 and side members 222 and thereby the frame carrying the cylinders 113, 114. The frame carrying the cylinders 113, 114 also carries the means for applying paste to the labels during the movement of the latter from the cylinder 113 to the cylinder 114, and these paste applying means comprise the paste receptacle 127, a roller 128 within said receptacle, and a roller 129 which receives paste from the roller 128 and applies it to the labels as the latter travel upwardly from the roller 113 along the face of the frame 115 and to the cylinder 114. The paste receptacle 127 is detachably mounted upon a transverse bar 130 connecting the side frames 116, and it and its rollers 128, 129 may be of any suitable or usual form and construction, the receptacle and rollers illustrated not in themselves being of novel construction, but being suitable for the purposes of the machine described herein. The perforated cylinder 113, in the regular operation of the machine, takes the labels, one after another, from the top of the stack of labels 131 (Figs. 4, 7 and 9) and conveys them inwardly to the frame 115 which directs said labels to the cylinder 114, the roller 129 applying paste to the labels during their passage to said cylinder 114 and the frame 215 stripping the labels from said roller 129. The holder for the stack of labels 113 and the means for keeping said stack of labels, as the quantity of labels becomes gradually reduced, pressed upwardly to the proper height, will be hereinafter described.

The perforated cylinder 113 comprises a perforated cylindrical wall secured on end frames 132, 133 (Fig. 14) which have bearings in the side frames 116, and said cylinder 113 is open at one end, as shown in Fig. 14, to a chamber 134 from which leads a pipe 135 to which a suction blower (not shown) or other source of creating air pressure is connected, said pipe 135 preferably having a damper 136 for regulating the force of air sucked through it. Within the perforated cylinder 113 is provided a partition 137, which subdivides the interior of the cylinder into two chambers 138, 139 and confines the air suction action to the one chamber 138, which constitutes the live side of said cylinder 113. The labels are taken one after another at the lower end of the chamber 138 and carried, under air suction, by the wall of the cylinder along said chamber 138 until delivered to the frame 115, said labels at the upper end of the chamber 138 being released from the action of air suction because of their passage to and slightly beyond the upper end of the partition 137 and chamber 138. Air suction is not required in the chamber 139 of the cylinder 113 since the labels do not travel along said chamber. The cylinder 113 is formed with a series of annular grooves (Fig. 14), and the frame 115 is formed with a series of vertical fingers or bars (Figs. 26, 27) whose lower ends are always in said grooves and thereby at their lower extremities pass under the labels carried on the surface of the cylinder 113 and gradually deflect the labels from said cylinder at the upper end of the chamber 138. The frame 115 is fastened to the cross-bar 117 and the front surfaces of its fingers are curved to pass close along the rear side of the paste-roller 129 and thence upwardly and somewhat forwardly to the cylinder 114 in rear of the vertical fingers of the frame 215 which is fastened to the bar 118, which is removably secured to the frames 116 (Fig. 26).

The suction cylinder 114 corresponds in general respects with the cylinder 113, its interior being subdivided by a partition 140 into upper and lower chambers 141, 142, the latter being cut off from the air suction at all times. The cylinder 114 is provided with end frames 143, 144, which constitute end trunnions or shafts having bearings in the side frames 116. The end frame 144 is, as shown in Fig. 14, open and in communication with an air chamber 145, which may communicate with the air chamber 134 hereinbefore described. In the wall intermediate the air chambers 134, 145 I provide a valve 146, to be hereinafter described, by which communication between the chambers 134, 145 may be established or cut off, as occasion may require.

The cylinder 114 is provided in one part of its face with a transverse cushion, preferably of rubber, 147, shown by dotted lines in Figs. 11 and 12, and this cushion has formed in it an aperture 148 adapted, when the cylinder 114 is pressed against a can 58, to receive the projecting end of the strip 65, which, in the dressed can, projects through the label thereon.

The cylinder 114 and the frame carrying the same are adapted to have a limited oscillatory motion on the end frames 132, 133 of the lower cylinder 113, for the purpose of causing said cylinder 114 to, after receiving a label, when it is in the position shown in Fig. 11, tilt rearwardly and be pressed against the can 58 then held in position by the clamp-frame 51 to receive the label from said cylinder 114, the rear position of the cylinder 114 against the can being shown in Fig. 13.

Upon a comparison of Figs. 11, 13 it will be seen that when the cylinder 114 is in a position to tilt its label to the can 58, said cylinder tilts rearwardly against the can, as shown in Fig. 13, at the time that the aperture 148 in the cushion 147 is in position to pass on and receive the projecting end of the metal strip 65 carried by the can, the movement of the cylinder 114 against the can serving to enable said projecting end of the metal strip to puncture the label while entering the aperture 148. The cylinder 114 will remain in the position shown in Fig. 13, in the meantime rotating, until the label has been fully applied to the can 58, after which the frame carrying the cylinder 114 will tilt frontwardly to the position illustrated in Fig. 11.

The means for tilting the air cylinder 114 toward and from the can held by the clamp frame 51 and for rotating the cylinders 113, 114 and paste rollers 128, 129, are more clearly illustrated in Figs. 11 and 12. Both the tilting movement of the cylinder 114 and the rotary movement of the cylinders 114, 113, and the rotary movement of the paste rollers, are effected from the shaft 99, upon one end of which is a cam 149 for effecting the tilting of the cylinder 114 and upon the other end of which is a gear wheel 150 from which the rotary movement of the air cylinders and paste rollers is communicated. The cam 149 is in engagement with a forked rod 151 whose upper end is pivotally secured, at 152, to one of the side frames 116, and during the rotation of the shaft 99 and cam 149, said rod 151 is caused to elevate the front end of the frame carrying the air cylinders and thereby tilt the cylinder 114 to its can-engaging position shown in Fig. 13. The cam 149 also operates through the rod 151 to restore the frame carrying the cylinder 114 and said cylinder itself to their position shown in Fig. 11. The gear wheel 150 has teeth 153 along about one-half of its periphery, while along the other half of the periphery of said wheel is a plain surface 154.

Above the gear wheel 150 and mounted on a short shaft 155 is a pinion wheel 156 which is rigid with a slide 157 and gear wheel 158. The slide 157 is curved at its upper and lower ends, as shown in Fig. 11, and when the pinion wheel is not in engagement with the gear teeth 153 of the wheel 150, the curved end of said slide 157 is in engagement with the flange 159 projecting laterally from the smooth surface 154 of said wheel 150, the said flange 159 riding against a curved end of said slide 157 which at that time locks the pinion wheel 156 and gear wheel 158 against rotation. When the end of the flange 159 passes from the slide 157 and the gear teeth 153 of the wheel 150 reach the pinion wheel 156, said slide will become inoperative and the pinion wheel 156 will be rotated and communicate its motion to the gear wheel 158. The slide 157 and flange 159 are well-known mechanical features and serve to lock the pinion wheel 156 stationary except when it is desired that said pinion wheel shall have a positive rotary movement imparted to it by the gear teeth 153. The gear wheel 158 is in constant mesh with the gear wheel 160 secured on the end frame 132 of the lower air cylinder 113, and said air cylinder receives its motion from said gear wheels 158, 160. The gear wheel 160 on the lower air cylinder meshes with a pinion wheel 161 which is on a short shaft with a pinion wheel 162 (Fig. 12), and said pinion wheel 162 is in mesh with a gear wheel 163 rigidly secured on the end frame of the air cylinder 114, and said cylinder 114 thus receives its rotary motion from the gear wheel 160 through the intermediate pinion wheels 161, 162 and the gear wheel 163.

The paste roller 129 has upon the end of its shaft a gear wheel 164 (Fig. 11) which is in mesh with the gear wheel 160 on the end of the lower air cylinder 113. The paste roller 129, therefore, receives its rotary motion from the gear wheels 160, 164, and the motion of this paste roller 129 is communicated to the lower paste roller 128 by the frictional contact of the surfaces of said two rollers. In the preferred timing and construction of the machine I give the top paste roller 129 a surface speed slightly greater than the surface speed of the air cylinders 113 and 114, and this is for the purpose of enabling said paste roller, traveling more rapidly than the labels ascending along the frame 115, to efficiently wipe its paste against said labels.

It has been mentioned hereinbefore that the air suction is constant on the lower cylinder 113, and is applied to the cylinder 114 as the occasion may require. The means for applying the air suction to and cutting the same off from the cylinder 114, is the valve 146, hereinbefore referred to, which is operated by means of the cam 149 (Fig. 14) bell-crank lever 165, link 166 and rock shaft 167, having an arm 168 pivotally connected with the upper end of said link 166, and an arm 169 whose lower end bears against the outer end of the stem 170 of said valve 146. The valve stem 170 extends through a bearing in the side frame of the machine and is provided with a coiled spring 171 which is compressed during the opening of the valve 146 and expands during the closing of said valve and keeps the outer end of the valve stem 170 against the crank arm 169. The cam 149 engages at its outer face with a small roller carried by the bell crank 165 and with said bell crank actuates the link 166, rock shaft 167, crank arm 169 and valve 146. The cam 149 is utilized for tilting the cylinder 114 against the can to receive the label and also to operate the mechanism for actuating the valve 146, and in the timing of the machine the valve 146 is constantly open until the cylinder 114 is pushed against the can, or tilted rearwardly, as shown in Fig. 13, at which time the suction is cut off from the cylinder 114 by the closing of the valve 146, so that the air suction may be relieved from the label whose end is then pressed against the can. When the cylinder 114 is returned to its initial position or receded from the can (Fig. 11), the suction is again admitted thereto, the exact time of opening the valve 146 to admit the air to the cylinder 114 being just before the succeeding label carried upwardly by the cylinder 113 reaches said cylinder 114, or in other words, the suction is restored to the cylinder 114 just at the time said cylinder is to take up and carry along on its surface the succeeding label. The time of tilting the cylinder 114 rearwardly against the can is, of course, when the can and the cushion 147 reach the relation in which they are shown in Fig. 11, and this happens at the end of each rotation of said cylinder 114. The cylinder 114, therefore, makes one rotation and stops, and is then tilted rearwardly against the can, at which time also the suction is cut off from said cylinder. After the end of the label has been pressed against the can by the cylinder 114 on its rearward movement, said cylinder is restored to its initial position and set in rotation as before. The cylinders, 113, 114 and paste roller 129 are timed in their rotations by means of the gear wheel 150 from which they derive their movement, said gear wheel having a constant rotation with the shaft 99, but being without teeth along a portion of its periphery, as shown in Fig. 11, whereby said cylinders and paste roller have a period of rest and a period during which they are in simultaneous rotation.

The means for supplying the labels one after another to the lower air cylinder are more clearly illustrated in Fig. 4 and Figs. 6 to 10 inclusive, and comprise a plate or holder 172 adapted to hold a stack 131 of labels and capable of both tilting movement and vertical adjustment. The plate 172 is fastened upon the longitudinal frame 173, and I provide vertical rods 174 between which the labels are placed and which maintain the same in stack condition. At the front end of the stack of labels I provide two vertical rods 175 against which the front end of the stack 131 is pressed and which are threaded. The threads on the rods 175 serve, when the stack of labels is pushed against said rods, to somewhat separate the ends of the labels and facilitate the action of the air cylinder 113 in taking up one label at a time. Some labels have a tendency to stick together, and I have found that when the rods 175 are threaded and the labels pushed against them, the tendency of the labels to cling together is in a measure obviated and that the action of the cylinder 113 in taking up one label at a time is facilitated. The stack of labels may be crowded against the front rods 175 by rear rods 275 flexed against said stack. The frame 173 is formed at its ends with vertical sleeves 176, which pass upon vertical end rods 177 carried by a frame 178 upon which the frame 173 and parts carried by it, are mounted. The frame 173 is capable of vertical adjustment along the rods 177, and the frame 178 carrying the frame 173 and stack 131 is mounted at its rear end on a transverse pivot rod 179, on which said frame 178 may, at the proper time, have a tilting motion, the means for tilting the frame 178 acting against the front end thereof to raise the front end of the stack 131 against the air cylinder 113 at the moment it is desired that said cylinder take the top label from said stack, after which the front end of the frame 178 is again lowered to its initial position shown in Fig. 7. The means for tilting the front end of the frame 178 and stack 131 upwardly against the air cylinder 113 comprise a cam 180 secured on the shaft 99 and connected by a rod 181 with a forwardly projecting portion of said frame 178. During the rotation of the cam 180 the rod 181 is alternately elevated and lowered and during its movements raises and lowers the front end of the frame 178.

The means for effecting the vertical adjustment of the frame 173 on the rods 177, comprise transverse shafts 182, 183 (Fig. 7), crank arms 184 connected with said shafts, links 185 connecting said crank arms with the frame 173, and means for imparting a rotary motion to said shafts 182, 183 for causing their crank arms 184 to, through the links 185, act on said frame 173. The means for rotating the shafts 182, 183, comprise pinion wheels 186 fastened on said shafts, a slidable toothed bar 187 in mesh with said pinion wheels, and a spring 188 connected with said bar 187 and normally acting to draw it rearwardly and to effect the rotation of the pinions 186 for the purpose of elevating the frame 173 and stack 131. Since it is desired that the shafts 182, 183 and parts connected therewith shall only elevate the frame 173 in a step by step manner, so as to maintain the top of the stack 131 on a uniform given plane, as the labels are one after another removed by the cylinder 113, the spring 188 must be kept under restraint, otherwise it would move the entire stack of labels upwardly as far as the adjoining portions of the machine would permit. Each upward movement of the frame 173 is intended to be equal to the thickness of one label, so that after a label has been removed from the stack, the entire stack may be elevated a distance equal to the thickness of the removed label.

The means for limiting the action of the spring 188 against the rack bar 187 comprise an eccentric 189 secured on a shaft 190 and adapted, when in one position, to bind against the rack bar 187 and hold it stationary, while when said eccentric 189 is momentarily released from the bar 187, said bar, under the action of the spring 188, may slide rearwardly to a limited extent and thereby actuate the pinion wheels 186 to effect through the arms 184 and links 185 an upward movement of the frame 173. The eccentric 189 normally locks the rack bar 187 stationary, and the means provided for releasing said eccentric 189 from said bar 187 comprise an arm 191 secured on the shaft 190 and connected with a vertical bar 192 which is operable from a cam 193 on the shaft 99, said cam being pinned to and rotating with the cam 180. The cam 193 has a toe which rides against a roller 194, Fig. 7, carried by the rod 192, and while this toe is passing said roller it depresses the rod 192 and thereby through the crank arm 191 and shaft 190 momentarily turns the eccentric 189 downwardly toward the front free of the rack bar 187, and it is at this particular moment that the spring 188 is permitted to slide said rack bar 187. During each rotation of the shaft 99 and cam 193 the eccentric 189 is momentarily released from the rack bar 187, and hence during each rotation of said shaft the frame 173 and stack 131 are pushed upwardly to a limited extent, each upward movement being about equal to the thickness of a label. The vertical adjustment of the frame 173 and stack 131 may also be effected manually by means of a handle 195 and crank arm 196, the latter being secured to the shaft 190. The eccentric 189 may be released from the bar 187 by turning the handle 195 upwardly for that purpose. It might be desirable to adjust the frame 173 on the rods 177 in accordance with the number of labels in the stack 131 so that the top of the stack may, in starting the machine, be placed at the predetermined level, and this adjustment of the frame 173 may be accomplished by the attendant through the manipulation of the handle 195. Thereafter the further movement of the frame 173 would be the step by step action hereinbefore described accomplished by the crank arms 184 and links 185 from the shaft 99 and cam 193. The shaft 190 for the eccentric 189 has on its end a spring 290 (Fig. 10) which acts in a direction to keep the said eccentric in its locking position against the bar 187. The tilting action of the frame 178 on the rod 179 enables me to elevate the front end of the stack 131 to the lower air-cylinder 113 and then to lower said stack after said cylinder has taken the top label therefrom. I find it convenient to allow the front end of the stack 131 an inch movement in its elevation to and descent from the air-cylinder 113.

The operation of the machine will be largely understood from the description hereinbefore presented and only brief further reference to such operation seems necessary.

The cans 58 are fed by hand to the feed-frame 50 and are gripped in the pockets thereof by the spring-members 60 of said frame. When cans having a weakened strip 65 provided with a projecting end are to be treated, the machine should have an index or shouldered plate or bar 66 against which the projecting ends of the strips may be initially placed as the cans are fed to the frame 50. The feed-frame 50 and clamp-frame 51 have intermittent rotary motions toward each other, at each motion the frame 50 carrying a can to the clamp-frame and clamp-frame carrying a pair of clamps to take said can therefrom. The cans are in succession taken by the clamp-frame 51 from the feed-frame 50 and carried downwardly by the clamp-frame to the label supplying and applying devices, the cam 90 on the shaft of the clamp-frame being utilized, in connection with the rod 96, for effecting the gripping of the cans by the clamps and the release of the clamps from the cans, after the latter have been labeled. The labels are taken from the stack 131 by the suction cylinder 113 and by the latter conveyed upwardly along the frame 115 and paste roller 129 to the suction cylinder 114, which gripping the labels by air suction will draw them upwardly along the paste roller 129 and convey them to the cans. During the upward movement of the labels from the air-cylinder 113 to the air-cylinder 114, paste is applied to said labels by means of the paste-roller 129. The frame 115, shown more clearly in Figs. 26 and 27, is in the form of a grid of vertical parallel bars, whose lower forwardly projecting portions are within the annular grooves formed in the air-cylinder 113. One object in making the frame 115 in the form of narrow vertical bars is so that the lower ends of said bars may lie within the grooves of the air cylinder 113 and deflect the labels from said cylinder, and a further object is to cause said frame 115 to present the minimum surfaces to the labels during their transit from the cylinder 113 to the cylinder 114. The paste-roller 129 applies paste to the labels while they are traveling upwardly over the frame 115, and said labels are prevented from following the roller 129 by the frame 215, which, as shown in Fig. 28, is in the form of a grid or series of vertical fingers tapered at their lower ends and closely engaging the surface of the roller 129. By forming the frame 215 of narrow fingers tapered to a point at their lower ends, said frame presents the minimum surfaces to the roller 129 and therefore does not materially disturb the paste thereon. Upon the labels reaching the upper end of the frame 115 they are immediately caught by the air suction within the cylinder 114 and the latter is enabled to convey them to the cans. The cylinder 114 is provided with the cushion 147 having the aperture 148 and at the end of each rotation of said cylinder this cushion 147 comes into register with a can held by the clamp-frame 51, and thereupon said cylinder is tilted rearwardly against the can, the projecting end of the strip 65 on the can entering the aperture 148 in said cushion, whereby said projecting end may pierce the label instead of becoming flattened. The cushion 147 yieldingly presses the label against the can and thereby the end of the label becomes stuck to the can. Thereafter the clamp-frame 51 starts in rotation and the cylinder 114, whose air-suction is cut off, returns to its initial position. The rotation of the clamp-frame 51 carries the can with the label connected with it down along the arc-shaped brush 106, and during this movement of the can against said brush, said can is rotated from the teeth 108 on the stationary gear frame 80, as hereinbefore explained, with the result that the label is wrapped around and evenly pressed against the can. The finished can is discharged down the chute 84. The brush 106 is adjustably secured in position, as shown in Fig. 4, so that its upper surface may be adjusted toward or from the path of the cans and the pressure of the brush against the cans regulated at will. At the end of each intermittent motion of the clamp-frame 51 a can is presented in position to receive a label from the cylinder 114, and hence at the end of each of said movements of said clamp-frame, said cylinder is tilted rearwardly to press the end of a label against the can, after which the cylinder 114 moves frontwardly to its initial position and the clamp frame carries the can along the brush 106, at the same time rotating it, and finally the dressed can is released to descend down the chute 84. The air-suction is cut off from the cylinder 114 for the purpose of enabling the delivery of the label to the can, and is again turned on said cylinder in time for said cylinder to grip the upper end of the succeeding label fed to it by the cylinder 113. I allow the air suction to act within the cylinder 113 at all times.

What I claim as my invention and desire to secure by Letters-Patent, is:

1. In a machine for applying labels and the like to cans and other articles, a rotary clamp-frame comprising sides carrying oppositely disposed clamps, the clamps of one set being movable toward and from the clamps of the other set, means for imparting an intermittent motion to said frame, means for causing each pair of clamps in succession to clamp a can fed between them, means for applying a label having paste applied to one side to the can clamped by said frame, means for rotating the can held by said clamp-frame for wrapping the label around it, a brush against which the can is carried, while rotating, by said frame, and means for finally releasing the can, said means for effecting the clamping and release of the cans comprising pivoted radial lever-arms connected with the movable clamps, a grooved cam engaging the inner ends of said arms and thereby controlling the position of the outer ends thereof and the clamps connected with them, and means for causing said cam to rotate with said frame during a portion of its rotary movement and thereafter reversing the movement of said cam when said frame is at rest for effecting the clamping of a can; substantially as set forth.

2. In a machine for applying labels and the like to cans and other articles, a rotary clamp-frame comprising sides carrying oppositely disposed clamps, the clamps of one set being movable toward and from the clamps of the other set, means for imparting an intermittent motion to said frame, means for causing each pair of clamps in succession to clamp a can fed between them, means for applying a label having paste on one side to the can clamped by said frame, and means for effecting the wrapping of the label around the can, said means for effecting the clamping of the cans comprising pivoted radial lever-arms connected with the movable clamps, a grooved cam engaging the inner ends of said arms and thereby controlling the position of the outer ends thereof and the clamps connected with them, and means for causing said cam to rotate with said frame during a portion of its rotary movement and thereafter reversing the movement of said cam when said frame is at rest for effecting the clamping of a can; substantially as set forth.

3. In a machine for applying labels and the like to cans and other articles, a rotary clamp-frame comprising sides carrying oppositely disposed clamps, the clamps of one set being movable toward and from the clamps of the other set, means for causing the pairs of clamps in succession to clamp a can fed between them, means for applying labels to the clamped cans, a rotary feed-frame for delivering the cans to the clamp-frame, and means for imparting corresponding intermittent movements to said clamp-frame and feed-frame, said feed-frame having pockets in its periphery formed of pairs of clamping-arms between which the cans are placed and one of each pair of which is yieldingly mounted and which arms with the cans between them are adapted to move between the clamps of said clamp-frame when said clamps are in their open position; substantially as set forth.

4. In a machine for applying labels and the like to cans and other articles, a rotary clamp-frame comprising sides carrying oppositely disposed clamps, the clamps of one set being movable toward and from the clamps of the other set, means for causing the pairs of clamps in succession to clamp a can fed between them, means for applying labels to the clamped cans, a rotary feed-frame for delivering the cans to the clamp-frame, and means for imparting corresponding intermittent movements to said clamp-frame and feed-frame, combined with means for rotating the clamped cans for wrapping the labels around them, and means for releasing the labeled cans, said means for releasing the labeled cans comprising means for moving one set of the clamps outwardly from them, plungers in the other set of clamps and normally inactive, and means for moving said plungers against said cans at their discharge position so as to positively detach them; substantially as set forth.

5. In a machine for applying labels and the like to cans and other articles, a rotary clamp-frame comprising sides carrying oppositely disposed rotary clamps whose spindles are mounted in said sides, the clamps of one set being movable toward and from the clamps of the other set, means for imparting an intermittent motion to said frame, means for causing the pairs of clamps in succession to clamp a can fed between them, means for applying a label against the can held by said frame, means for rotating the clamped can for wrapping the label around it, and means for thereafter effecting the release of the labeled can, the means for rotating and controlling the clamped can comprising pinion wheels (78) and blocks (79) secured on the spindles of one set of said clamps and a stationary wheel (80) having on its periphery a set of gear teeth (108) to engage said pinion wheels and arc flanges at opposite sides thereof to engage said blocks for locking said spindles and their clamps against rotation; substantially as set forth.

6. In a machine for applying labels and the like to cans and other articles, a rotary clamp-frame comprising sides carrying oppositely disposed rotary clamps whose spindles are mounted in said sides, the clamps of one set being movable toward and from the clamps of the other set, means for imparting an intermittent motion to said frame, means for causing the pairs of clamps in succession to clamp a can fed between them, means for applying a label against the can held by said frame, means for rotating the clamped can for wrapping the label around it, and means for thereafter effecting the release of the labeled can, the means for rotating and controlling the clamped can comprising pinion wheels (78) and blocks (79) secured on the spindles of one set of said clamps and a stationary wheel (80) having on its periphery a set of gear teeth (108) to engage said pinion wheels and arc flanges at opposite sides thereof to engage said blocks for locking said spindles and their clamps against rotation, combined with a curved brush in the path of the clamped can and against which it is rotated for effecting the smooth application of the label; substantially as set forth.

7. In a machine for applying labels and the like to cans and other articles, a clamp-frame to which the cans are fed, means for imparting an intermittent motion to said frame, a holder for the labels, means for applying a label having paste on one side to each can presented by said frame, and means for rotating such can for wrapping the label around it, said label applying means comprising a rotary suction-cylinder for removing the label from the holder, a second rotary suction-cylinder for receiving the label and applying it to the can, and a paste-roller for applying paste to one side of the label during its transit from one of said cylinders to the other; substantially as set forth.

8. In a machine for applying labels and the like to cans and other articles, a clamp-frame to which the cans are fed, means for imparting an intermittent motion to said frame, a holder for the labels, means for applying a label having paste on one side to each can presented by said frame, and means for rotating such can for wrapping the label around it, said label applying means comprising a rotary suction-cylinder for removing the label from the holder, a second rotary suction-cylinder for receiving the label and applying it to the can, and a paste-roller for applying paste to one side of the label during its transit from one of said cylinders to the other, combined with a curved brush in the path of the rotating cans for effecting the smooth application of the labels thereto; substantially as set forth.

9. In a machine for applying labels and the like to cans and other articles, a clamp-frame to which the cans are fed, means for imparting an intermittent motion to said frame, a holder for the labels, means for applying a label having paste on one side to each can presented by said frame, and means for rotating such can for wrapping the label around it, said label applying means comprising a rotary suction-cylinder for removing the label from the holder, a second rotary suction-cylinder for receiving the label and applying it to the can, a paste-roller for applying paste to one side of the label during its transit from one of said cylinders to the other, a grid frame interposed between said cylinders over which the labels travel and while on which they receive their paste, and a grid frame over the paste roller for preventing the adhesion of the labels thereto and directing them to the upper suction-cylinder; substantially as set forth.

10. In a machine for applying labels and the like to cans and other articles, a clamp-frame to which the cans are fed, means for imparting an intermittent motion to said frame, a holder for the labels, means for applying a label having paste on one side to each can presented by said frame, and means for rotating such can for wrapping the label around it, said label applying means comprising a rotary suction-cylinder for removing the label from the holder, a second rotary suction-cylinder for receiving the label and applying it to the can, a paste-roller for applying paste to one side of the label during its transit from one of said cylinders to the other, a grid frame interposed between said cylinders over which the labels travel and while on which they receive their paste, and a grid frame over the paste roller for preventing the adhesion of the labels thereto and directing them to the upper suction-cylinder, the lower suction-cylinder having annular grooves over its surface to receive the lower ends of the members of said interposed grid frame; substantially as set forth.

11. In a machine for applying labels and the like to cans and other articles, a clamp-frame to which the cans are fed, means for imparting an intermittent motion to said frame, a holder for the labels, means for applying a label having paste on one side to each can presented by said frame, and means for rotating such can for wrapping the label around it, said label applying means comprising a rotary suction-cylinder for removing the label from the holder, a second rotary suction-cylinder for receiving the label and applying it to the can, and a paste-roller for applying paste to one side of the label during its transit from one of said cylinders to the other, combined with means for imparting intermittent rotary motion to said second suction-cylinder, and means for bringing the label on said cylinder and the can held by the clamp-frame together when said cylinder and frame are at rest; substantially as set forth.

12. In a machine for applying labels and the like to cans and other articles, a clamp-frame to which the cans are fed, means for imparting an intermittent motion to said frame, a holder for the labels, means for applying a label having paste on one side to each can presented by said frame, and means for rotating such can for wrapping the label around it, said label applying means comprising a rotary suction-cylinder for removing the label from the holder, a second rotary suction-cylinder for receiving the label and applying it to the can, and a paste-roller for applying paste to one side of the label during its transit from one of said cylinders to the other, combined with means for imparting intermittent rotary motion to said second suction-cylinder, and means for bringing the label on said cylinder and the can held by the clamp-frame together when said cylinder and frame are at rest, said second cylinder having a cushion in its surface for aiding in effecting the adherence of the paste-coated label to the can; substantially as set forth.

13. In a machine for applying labels and the like to cans and other articles, a clamp-frame to which the cans are fed, means for imparting an intermittent motion to said frame, a holder for the labels, means for applying a label having paste on one side to each can presented by said frame, and means for rotating such can for wrapping the label around it, said label applying means comprising a rotary suction-cylinder for removing the label from the holder, a second rotary suction-cylinder for receiving the label and applying it to the can, and a paste-roller for applying paste to one side of the label during its transit from one of said cylinders to the other, combined with means for imparting intermittent rotary motion to said second suction cylinder, a tiltable frame supporting said cylinder, means for tilting said frame to move the label on said cylinder against a can held by said clamp-frame when the latter is at rest, and means for cutting off the air-suction from said cylinder for releasing the label to the can; substantially as set forth.

14. In a machine for applying labels and the like to cans and other articles, a clamp-frame to which the cans are fed, means for imparting an intermittent motion to said frame, a holder for the labels, means for applying a label having paste on one side to each can presented by said frame, and means for rotating such can for wrapping the label around it, said label applying means comprising a rotary suction-cylinder for removing the label from the holder, a second rotary suction-cylinder for receiving the label and applying it to the can, and a paste-roller for applying paste to one side of the label during its transit from one of said cylinders to the other, combined with means for imparting intermittent rotary motion to said second suction-cylinder, a tiltable frame supporting said cylinder, means for tilting said frame to move the label on said cylinder against a can held by said clamp-frame when the latter is at rest, and means for cutting off the air suction from said cylinder for releasing the label to the can, said second cylinder having a cushion in its surface for aiding in effecting the adherence of the label to the can; substantially as set forth.

15. In a machine for applying labels and the like to cans and other articles, a rotary clamp-frame to which the cans are fed, means for imparting intermittent motion to the same, an air-suction cylinder, means for imparting intermittent rotary motion to said cylinder, means for delivering the labels, one after another, with paste on one side to said cylinder, means for pressing said cylinder with the label on it against a can held by said clamp-frame for starting the transfer of the label thereto, means for cutting off the air from said cylinder for releasing the label, and means for rotating said can for wrapping the label around it; substantially as set forth.

16. In a machine for applying labels and the like to cans and other articles, a rotary clamp-frame to which the cans are fed, means for imparting intermittent motion to the same, an air-suction cylinder, means for imparting intermittent rotary motion to said cylinder, means for delivering the labels, one after another, with paste on one side to said cylinder, means for pressing said cylinder with the label on it against a can held by said clamp-frame for starting the transfer of the label thereto, means for cutting off the air from said cylinder for releasing the label, and means for rotating said can for wrapping the label around it, combined with a curved brush in the path of the rotating can for effecting the smooth application of the label thereto; substantially as set forth.

17. In a machine for applying labels and the like to cans and other articles, a rotary clamp-frame to which the cans are fed, means for imparting intermittent motion to the same, an air-suction cylinder, means for imparting intermittent rotary motion to said cylinder, means for delivering the labels, one after another, with paste on one side to said cylinder, means for pressing said cylinder with the label on it against a can held by said clamp-frame for starting the transfer of the label thereto, means for cutting off the air from said cylinder for releasing the label, and means for rotating said can for wrapping the label around it, said cylinder having a cushion in its surface to be pressed against the can, combined with a curved brush in the path of the rotating can for effecting the smooth application of the label thereto; substantially as set forth.

18. In a machine for applying labels and the like to cans and other articles, a rotary clamp-frame to which the cans are fed, means for imparting intermittent motion to the same, an air-suction cylinder, means for imparting intermittent rotary motion to said cylinder, means for delivering the labels, one after another, with paste on one side to said cylinder, means for pressing said cylinder with the label on it against a can held by said clamp-frame for starting the transfer of the label thereto, means for cutting off the air from said cylinder for releasing the label, and means for rotating said can for wrapping the label around it; said cylinder having a hole in its surface to receive a projecting end of a weakened strip encircling the can, combined with means for assuring the registry of said projecting end with said hole; substantially as set forth.

19. In a machine for applying labels and the like to cans and other articles, a rotary clamp-frame to which the cans are fed, means for imparting intermittent motion to the same, an air-suction cylinder, means for imparting intermittent rotary motion to said cylinder, means for delivering the labels, one after another, with paste on one side to said cylinder, means for pressing said cylinder with the label on it against a can held by said clamp-frame for starting the transfer of the label thereto, means for cutting off the air from said cylinder for releasing the label, and means for rotating said can for wrapping the label around it, said cylinder having a hole in its surface to receive a projecting end of a weakened strip encircling the can, combined with a rotary feed frame to which the cans are fed and which delivers them to said clamp-frame, an index for guiding the operator in placing the cans in said feed-frame with the projecting ends of the strips on the cans in a given position, and means for rotating each can taken by the clamp-frame for placing the projecting end of its strip in registry with the hole in the cylinder; substantially as set forth.

20. In a machine for applying labels and the like to cans and other articles, a clamp-frame to which the cans are fed, means for imparting an intermittent motion to said frame, a holder for the labels, means for applying a label having paste on one side to each can presented by said frame, and means for rotating such can for wrapping the label around it, said label applying means comprising a rotary suction-cylinder for removing the label from the holder, a second rotary suction-cylinder for receiving the label and applying it to the can, and a paste-roller for applying paste to one side of the label during its transit from one of said cylinders to the other, combined with means for elevating said holder with a stack of labels supported by it to the first suction-cylinder each time a label is to be removed thereby, and means for maintaining the top of said stack at a uniform level; substantially as set forth.

21. In a machine for applying labels and the like to cans and other articles, means for holding the cans, air-suction means for taking the labels, one after another, and conveying them to the cans, means for applying paste to one side of the labels in transit, means for applying the labels having paste on one side to the cans, and a holder for supporting a stack of the labels and delivering them to said air-suction means, said holder comprising an upwardly tiltable frame, a vertically movable plate thereon supporting the stack of labels, means for tilting said frame to elevate the labels to said air-suction means, and means for elevating said plate and stack as the labels are removed to maintain the top of said stack on a given plane; substantially as set forth.

22. In a machine for applying labels and the like to cans and other articles, means for holding the cans, air-suction means for taking the labels, one after another, and conveying them to the cans, means for applying paste to one side of the labels in transit, means for applying the labels having paste on one side to the cans, and a holder for supporting a stack of the labels and delivering them to said air-suction means, said holder comprising an upwardly movable frame, a vertically movable plate thereon to support a stack of the labels, means for elevating said frame to present the top label of the stack to said air suction means, means for elevating said plate with the stack thereon as the labels are removed, and a rod having a roughened surface against which the top labels of the stack are placed and which aids in preventing more than one label at a time being taken by the suction means; substantially as set forth.

Signed at New York city, in the county of New York and State of New York, this 21st day of July A. D. 1908.

BENJAMIN W. TUCKER.

Witnesses:
ARTHUR MARION,
CHAS. C. GILL.